United States Patent
Klemets et al.

[11] Patent Number: 5,918,002
[45] Date of Patent: Jun. 29, 1999

[54] SELECTIVE RETRANSMISSION FOR EFFICIENT AND RELIABLE STREAMING OF MULTIMEDIA PACKETS IN A COMPUTER NETWORK

[75] Inventors: Anders Edgar Klemets, Sunnyvale; Anthony William Cannon, Mountain View; Srinivas Prasad Vellanki; Hemanth Srinivas Ravi, both of Milpitas, all of Calif.

[73] Assignee: Microsoft Corporation, Redmond, Wash.

[21] Appl. No.: 08/818,644

[22] Filed: Mar. 14, 1997

[51] Int. Cl.⁶ .................... H04L 1/08; H04L 1/10
[52] U.S. Cl. ............ 395/182.16; 371/32; 371/33; 455/7
[58] Field of Search .................. 371/32, 33, 35; 395/192.16; 455/7

[56] References Cited

U.S. PATENT DOCUMENTS

| | | | |
|---|---|---|---|
| 3,956,589 | 5/1976 | Weathers et al. . | |
| 3,979,719 | 9/1976 | Tooley et al. . | |
| 5,050,161 | 9/1991 | Golestani | 370/60 |
| 5,265,103 | 11/1993 | Brightwell | 371/32 |
| 5,313,454 | 5/1994 | Bustini et al. | 370/13 |
| 5,410,536 | 4/1995 | Shah et al. | 371/33 |
| 5,434,848 | 7/1995 | Chimento, Jr. et al. | 370/17 |
| 5,487,167 | 1/1996 | Dinallo et al. | 395/650 |
| 5,490,252 | 2/1996 | Macera et al. | 395/200.1 |
| 5,504,744 | 4/1996 | Adams et al. | 370/60.1 |
| 5,519,701 | 5/1996 | Colmant et al. | 370/60.1 |
| 5,566,175 | 10/1996 | Davis | 370/84 |
| 5,574,724 | 11/1996 | Bales et al. | 370/68.1 |
| 5,577,258 | 11/1996 | Cruz et al. | 395/800 |
| 5,612,949 | 3/1997 | Bennet . | |
| 5,754,754 | 5/1998 | Dudley et al. | 395/182.16 |
| 5,774,479 | 6/1998 | Lee et al. | 371/33 |

Primary Examiner—Ly V. Hua
Attorney, Agent, or Firm—Schwegman, Lundberg, Woessner & Kluth, P.A.

[57] ABSTRACT

An efficient and reliable transmission protocol for transmitting multimedia streams from a server to a client computer over a diverse computer network including local area networks (LANs) and wide area networks (WANs) such as the internet. The client computer includes a playout buffer for temporary storage of incoming data packets. When the client computer detects that a data packet has not arrived at said client computer by an expected time of arrival (ETA), a round trip time for the data packet is computed. The round trip time is an estimate of a period beginning from the time a retransmission request is sent to from the client computer to the stream server till the time a copy of the missing data packet is received at the client computer from the stream server in response to the retransmission request. If the round trip time is less than the time remaining before the missing packet is no longer useful to the on-demand application, then a retransmission request packet is sent to the server. Conversely if the round trip time is greater than the time remaining, i.e., the missing packet is likely to arrive after the usefulness of the packet has expired, then sending a retransmission request is likely to result in the late arrival of the missing data packet. Accordingly, the missing packet is discarded. This selective retransmission protocol can also be practiced with dynamic bandwidth selection wherein the transmission rate is dynamically matched to the available bandwidth capacity of the network connection between the server and the client computer.

38 Claims, 18 Drawing Sheets

SELECTIVE RETRANSMISSION FOR EFFICIENT AND RELIABLE STREAMING OF MULTIMEDIA PACKETS IN A COMPUTER NETWORK

RELATED APPLICATIONS

This application is related to co-pending U.S. application Ser. No. 08/818,805, filed on Mar. 14, 1997, entitled "Method and Apparatus for Implementing Motion Detection in Video Compression", U.S. application Ser. No. 08/819,507, filed on Mar. 14, 1997, entitled "Digital Video Signal Encoder and Encoding Method", U.S. application Ser. No. 08/818,804, filed on Mar. 14, 1997, entitled "Production of a Video Stream with Synchronized Annotations over a Computer Network", U.S. application Ser. No. 08/819,586, filed on Mar. 14, 1997, entitled "Method and Apparatus for Implementing Control Functions in a Streamed Video Display System", U.S. application Ser. No. 08/818,769, filed on Mar. 14, 1997, entitled "Method and Apparatus for Automatically Detecting Protocols in a Computer Network", U.S. application Ser. No. 08/818,127, filed on Mar. 14, 1997, entitled "Dynamic Bandwidth Selection for Efficient Transmission of Multimedia Streams in a Computer Network", U.S. application Ser. No. 08/819,585, filed on Mar. 14, 1997, entitled "Streaming and Display of a Video Stream with Synchronized Annotations over a Computer Network", U.S. application Ser. No. 08/818,664, filed on Mar. 14, 1997, entitled "Selective Retransmission for Efficient and Reliable Streaming of Multimedia Packets in a Computer Network", U.S. application Ser. No. 08/819,579, filed on Mar. 14, 1997, entitled "Method and Apparatus for Table-Based Compression with Embedded Coding", U.S. application Ser. No. 08/819,587, filed on Mar. 14, 1997, entitled "Method and Apparatus for Implementing Motion Estimation in Video Compression", U.S. application Ser. No. 08/818,826, filed on Mar. 14, 1997, entitled "Digital Video Signal Encoder and Encoding Method", all filed concurrently herewith, U.S. application Ser. No. 08/08/822,156, filed on Mar. 17, 1997, entitled "Method and Apparatus for Communication Media Commands and Data Using the HTTP Protocol", provisional U.S. application Ser. No. 60/036,662, filed on Jan. 30, 1997, entitled "Methods and Apparatus for Autodetecting Protocols in a Computer Network" U.S. application Ser. No. 08/625,650, filed on Mar. 29, 1996, entitled "Table-Based Low-Level Image Classification System", U.S. application Ser. No. 08/714,447, filed on Sep. 16, 1996, entitled "Multimedia Compression System with Additive Temporal Layers", and is a continuation-in-part of U.S. application Ser. No. 08/623,299, filed on Mar. 28, 1996, entitled "Table-Based Compression with Embedded Coding", which are all incorporated by reference in their entirety for all purposes.

BACKGROUND OF THE INVENTION

1. Field of the Invention

The present invention relates to multimedia communications. More particularly, the present invention relates to the efficient and reliable delivery of multimedia streams over a diverse computer network with dynamically variable bandwidth capacity.

2. Description of the Related Art

With the proliferation of connections to the internet by a rapidly growing number of users, the viability of the internet as a widely accepted medium of communication has increased correspondingly. Bandwidth requirements can vary significantly depending on the type of multimedia data being delivered. For example, a low resolution, low frame rate video telephone call may require only an ISDN connection, while a high resolution video broadcast of a live event to a large group of viewers may require the bandwidth of a T1 connection to the server. Hence, the ability to reliably and efficiently deliver multimedia data over a diverse computer network such as the internet is severely limited by the physical infrastructure and underlying transmission protocols of the network connection.

One problem is network route reliability. Because the internet was designed using redundant routes to compensate for any failures at the network and/or physical layer, reliability can be accomplished at the transport layer, e.g., TCP/IP. For example, if a packet is lost during transmission, the TCP transport layer waits for a predetermined timeout before automatically requesting a retransmission. As a result, in real-time applications, whenever packets are lost or delayed, wasteful automatic retransmission of the lost/delayed packets may occur after their respective usefulness have expired.

Another problem is the order of packet arrival. In networks such as the internet, in addition to the potential loss of packet(s) at the network/physical layer, at the network level, there is no guarantee that packets will arrive at the destination in the same order as they were transmitted. This further complicates the reliability problem because, the client computer now has to figure out if a "late" packet is simply lost or may arrive out of sequence later. Waiting too long before requesting a retransmission reduces the chance for a successful recovery, i.e., a successful timely retransmission of a lost packet, in a real-time application. On the other hand, not waiting long enough causes unnecessary (redundant) retransmissions.

In view of the foregoing, there are desired improved techniques for reliable and efficient transmission of multimedia streams to client(s) which efficiently utilizing the network resources available over a period of time.

SUMMARY OF THE INVENTION

The present invention provides efficient and reliable transmission of multimedia streams from a server to a client computer over a diverse computer network including local area networks (LANs) and wide area networks (WANs) such as the internet. Examples of multimedia streams provided to the client computer include a compressed video stream, a compressed audio stream, and an annotation stream with pointers to textual/graphical data in the form of HTML pages.

In one embodiment, the client computer includes a play-out buffer for temporary storage of incoming data packets. When the client computer detects that a data packet has not arrived at said client computer by an expected time of arrival (ETA), a round trip time for the data packet is computed. The round trip time is an estimate of a period beginning from the time a retransmission request is sent to from the client computer to the stream server till the time a copy of the missing data packet is received at the client computer from the stream server in response to the retransmission request.

If the round trip time is less than the time remaining before the missing packet is no longer useful to the on-demand application, then a retransmission request packet is sent to the server. Conversely if the round trip time is greater than the time remaining, i.e., the missing packet is likely to arrive after the usefulness of the packet has expired, then sending a retransmission request is likely to result in the late arrival of the missing data packet. Accordingly, the missing packet is discarded.

The selective retransmission of the present invention can also be practiced with a dynamic bandwidth selection wherein the transmission rate is dynamically matched to the available bandwidth capacity of the network connection between the server and the client computer. The transmission rate is selected from among a predetermined set of discrete bandwidth values. However dynamic bandwidth selection is also applicable to a system in which the transmission rate is selected from within a continuous range of bandwidth values.

These and other advantages of the present invention will become apparent upon reading the following detailed descriptions and studying the various figures of the drawings.

DETAILED DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order to not unnecessarily obscure the present invention.

Figure 1:
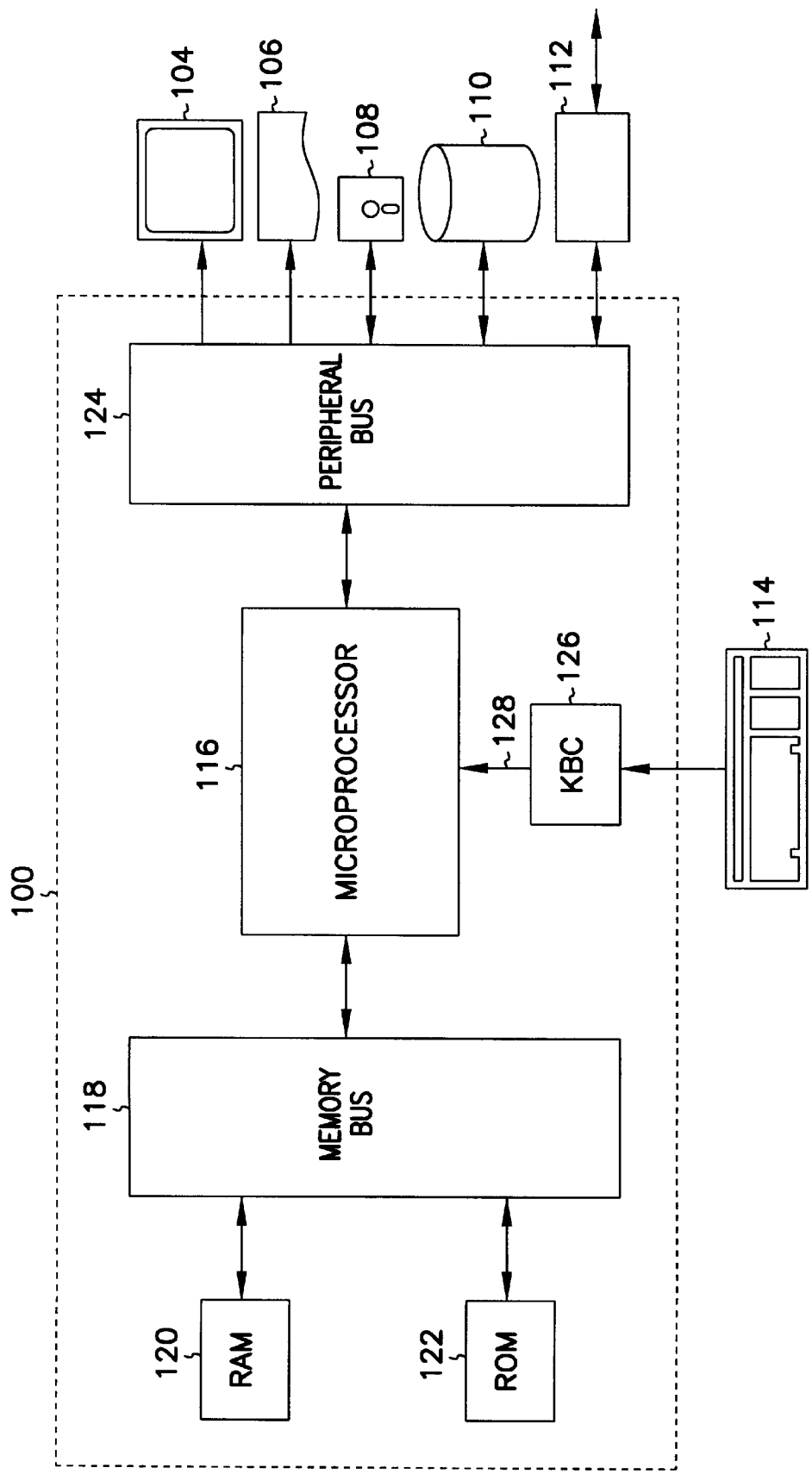
FIG. 1 is a block diagram of an exemplary computer system for practicing the various aspects of the present invention.

FIG. 1 is a block diagram of an exemplary computer system 100 for practicing the various aspects of the present invention. Computer system 100 includes a display screen (or monitor) 104, a printer 106, a floppy disk drive 108, a hard disk drive 110, a network interface 112, and a keyboard 114. Computer system 100 includes a microprocessor 116, a memory bus 118, random access memory (RAM) 120, read only memory (ROM) 122, a peripheral bus 124, and a keyboard controller 126. Computer system 100 can be a personal computer (such as an Apple computer, e.g., an Apple Macintosh, an IBM personal computer, or one of the compatibles thereof), a workstation computer (such as a Sun Microsystems or Hewlett-Packard workstation), or some other type of computer.

Microprocessor 116 is a general purpose digital processor which controls the operation of computer system 100. Microprocessor 116 can be a single-chip processor or can be implemented with multiple components. Using instructions retrieved from memory, microprocessor 116 controls the reception and manipulation of input data and the output and display of data on output devices.

Memory bus 118 is used by microprocessor 116 to access RAM 120 and ROM 122. RAM 120 is used by microprocessor 116 as a general storage area and as scratch-pad memory, and can also be used to store input data and processed data. ROM 122 can be used to store instructions or program code followed by microprocessor 116 as well as other data.

Peripheral bus 124 is used to access the input, output, and storage devices used by computer system 100. In the described embodiment(s), these devices include display screen 104, printer device 106, floppy disk drive 108, hard disk drive 110, and network interface 112. Keyboard controller 126 is used to receive input from keyboard 114 and send decoded symbols for each pressed key to microprocessor 116 over bus 128.

Display screen 104 is an output device that displays images of data provided by microprocessor 116 via peripheral bus 124 or provided by other components in computer system 100. Printer device 106 when operating as a printer provides an image on a sheet of paper or a similar surface. Other output devices such as a plotter, typesetter, etc. can be used in place of, or in addition to, printer device 106.

Floppy disk drive 108 and hard disk drive 110 can be used to store various types of data. Floppy disk drive 108 facilitates transporting such data to other computer systems, and hard disk drive 110 permits fast access to large amounts of stored data.

Microprocessor 116 together with an operating system operate to execute computer code and produce and use data. The computer code and data may reside on RAM 120, ROM 122, or hard disk drive 120. The computer code and data could also reside on a removable program medium and loaded or installed onto computer system 100 when needed. Removable program mediums include, for example, CD-ROM, PC-CARD, floppy disk and magnetic tape.

Network interface circuit 112 is used to send and receive data over a network connected to other computer systems. An interface card or similar device and appropriate software implemented by microprocessor 116 can be used to connect computer system 100 to an existing network and transfer data according to standard protocols.

Keyboard 114 is used by a user to input commands and other instructions to computer system 100. Other types of user input devices can also be used in conjunction with the present invention. For example, pointing devices such as a computer mouse, a track ball, a stylus, or a tablet can be used to manipulate a pointer on a screen of a general-purpose computer.

The present invention can also be embodied as computer readable code on a computer readable medium. The computer readable medium is any data storage device that can store data which can be thereafter read by a computer system. Examples of the computer readable medium include read-only memory, random-access memory, magnetic data storage devices such as diskettes, and optical data storage devices such as CD-ROMs. The computer readable medium can also be distributed over a network coupled computer systems so that the computer readable code is stored and executed in a distributed fashion.

Figure 2:
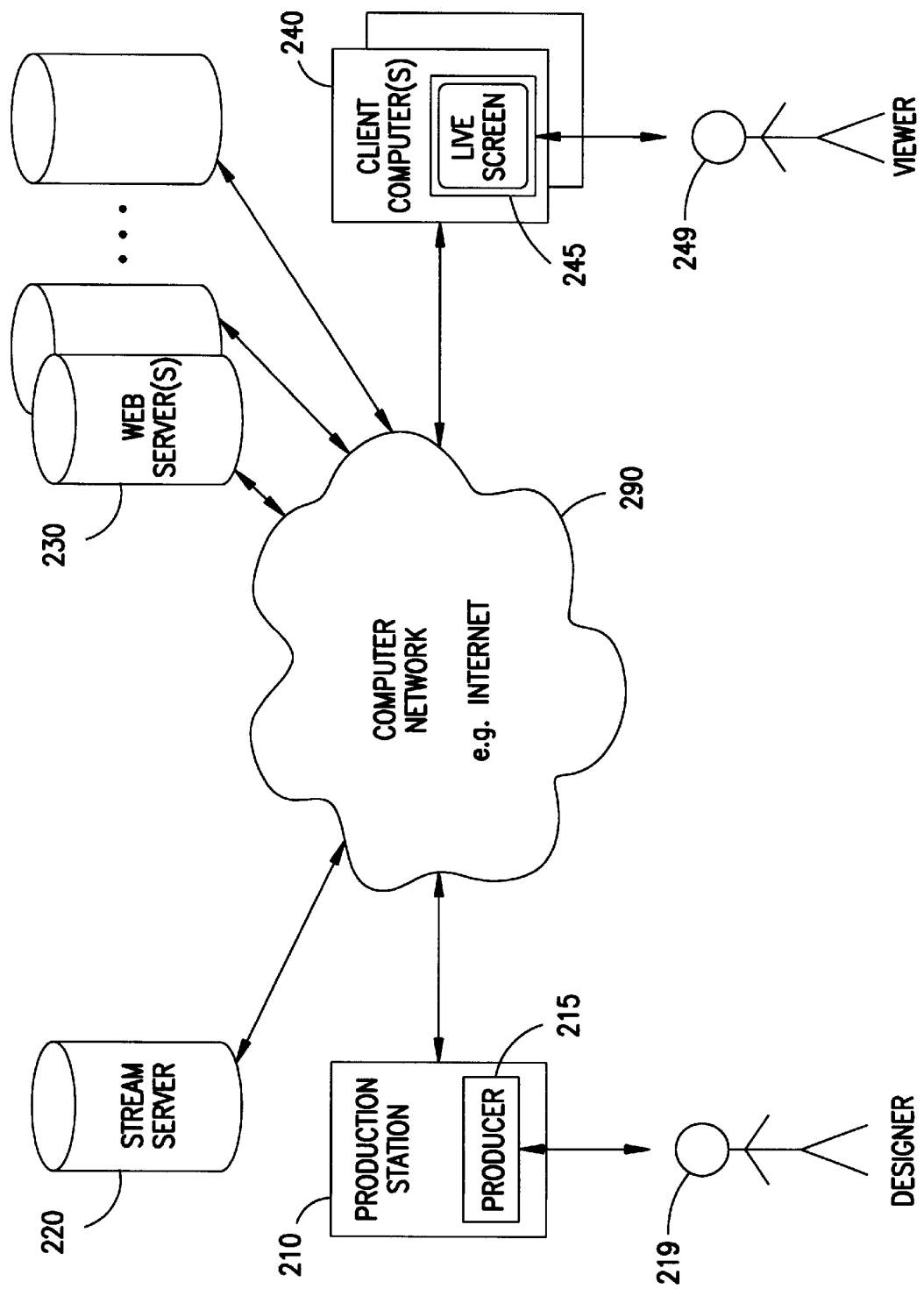
FIG. 2 is a block diagram showing an exemplary hardware environment for practicing the reliable and efficient video-on-demand (VOD) system of the present invention.

FIG. 2 is a block diagram showing an exemplary hardware environment for practicing the reliable and efficient video-on-demand (VOD) system of the present invention. The VOD system includes a production station 210, a stream server 220, at least one web server 230 and at least one client computer 240, each of which can be implemented using computer system 100 described above. Stream server 220 and web server 230 are coupled to client computer 240 via a computer network 290, e.g., the Internet. Note that the disclosed hardware environment is exemplary. For example, production station 210 and stream server 220 can be implemented using two separate computer systems or using one computer system. In addition, if production station 210 and stream server 220 are implemented on separate computer systems as shown in FIG. 2, an optional direct connection (not shown) between production station 210 and stream server 220 can provide faster uploads of compressed video and annotation streams. In the following description, an audio stream optionally accompanies each video stream.

A producer 215, installed in production station 210, is a user-friendly tool for use by a designer 219 to create a synchronization script which includes annotation stream(s). The annotation stream(s) define the content(s) of a LiveScreen display 245 to be displayed on client computer 240 for a viewer 249. LiveScreen display 245 provides a graphical user interface (GUI) with multiple windows for synchronously displaying a video stream from stream server 220 and at least one displayable event stream. Examples of displayable events include textual/graphical information such as HTML-scripted web page(s) from web server 230.

Figure 3:
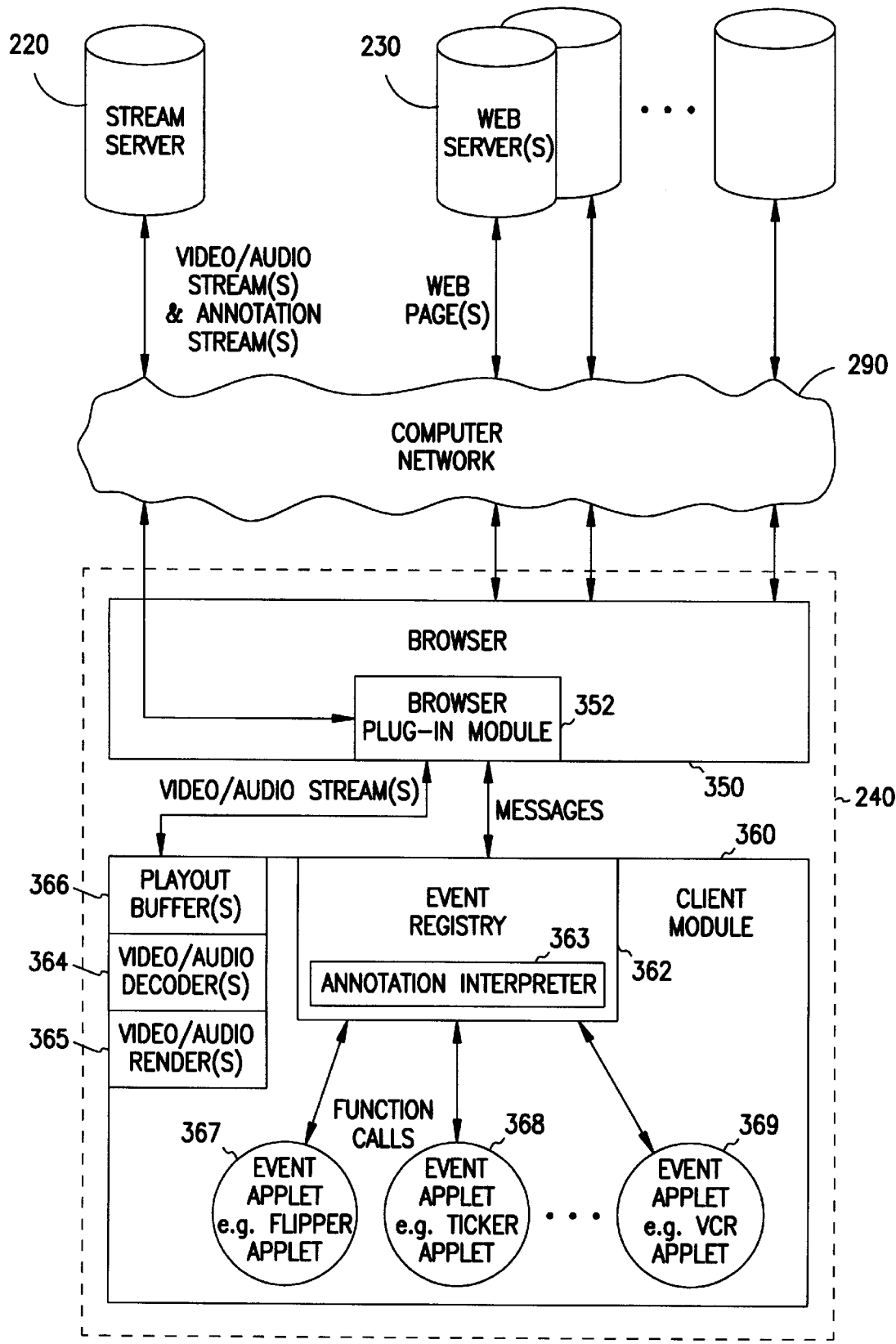
FIG. 3 is a block diagram showing a producer which includes a capture module and an author module for capturing video streams and for generating annotation streams, respectively.

Referring to FIG. 3, producer 215 includes a capture module 317 and an author module 318. Production station 210 includes 16 MB of RAM and a 1 GB hard disk drive for capturing and storing an uncompressed or precompressed video stream. Sources for generating video streams include a video camera 312, a video cassette recorder (VCR) (not shown) or a previously digitized video file 314, e.g., a Video for Windows (.avi) file. For ease of installation and use by designer 219, producer 215 is implemented in a host environment which includes a window-based operating system such as Microsoft Windows 95 and a web browser such as Netscape's Navigator 2.x.

Client computer 240 includes a web broswer 350 and a browser plug-in module 352 for interfacing web browser 350 with a main client module 360. Client module 360 includes an event registry 362, video/audio decoder(s) 364, video/audio renderer(s) 365, playout buffer(s) 366, and one or more dynamically loadable event applet(s), e.g., flipper applet 367, ticker applet 368 and VCR applet 369. In this embodiment, event registry 362 also functions as an annotation interpreter 363.

Co-pending applications 702, 712 and 718 provides a detailed description of the decompression and rendering of the video/audio streams at client computer 240 once the streamed packets have arrived from stream server 220.

The present invention is directed at the efficient and reliable streaming of data packets from stream server 220 to client computer 240, accomplished by optimally utilizing the bandwidth of the connection provided by computer network 290 while minimizing the loss of packets. In one embodiment, the transmission rate of the data stream is dynamically adjusted in response to changes in the bandwidth made available by computer network 290 for the network connection between server 220 and client computer 240. Accordingly, server 220, in response to feedback from client computer 240, dynamically selects transmission rates in order to better match the varying bandwidth capacity of the network connection. For example, server 220 streams video packets at 1 frames/second (fps), 5 fps, 10 fps, and 15 fps for bandwidths of 4 kbits/second (kbps), 14 kbps, 18 kbps, and 44 kbps.

In this embodiment, client module 360 includes playout buffer 366 which stores several seconds, e.g., 5 seconds, worth of data packets from the data stream. The buffer 366 enables data packets to independently traverse computer network 290, arrive at client computer 240 in a different order than they were originally transmitted, and be rearranged back to their original sequential order prior to processing by decoder 364 and then renderer 365. Playout buffer 366 also enables retransmitted (lost) packets to be inserted in their originally sequential order prior to processing by decoder 364. A suitable reordering algorithm, such as a "map" object from the Standard Template Library (STL) Toolkit can be used to reorder and/or insert packets in buffer 366. Accordingly, suitable data structures for playout buffer 366 include STL maps and linked lists.

Figure 4:
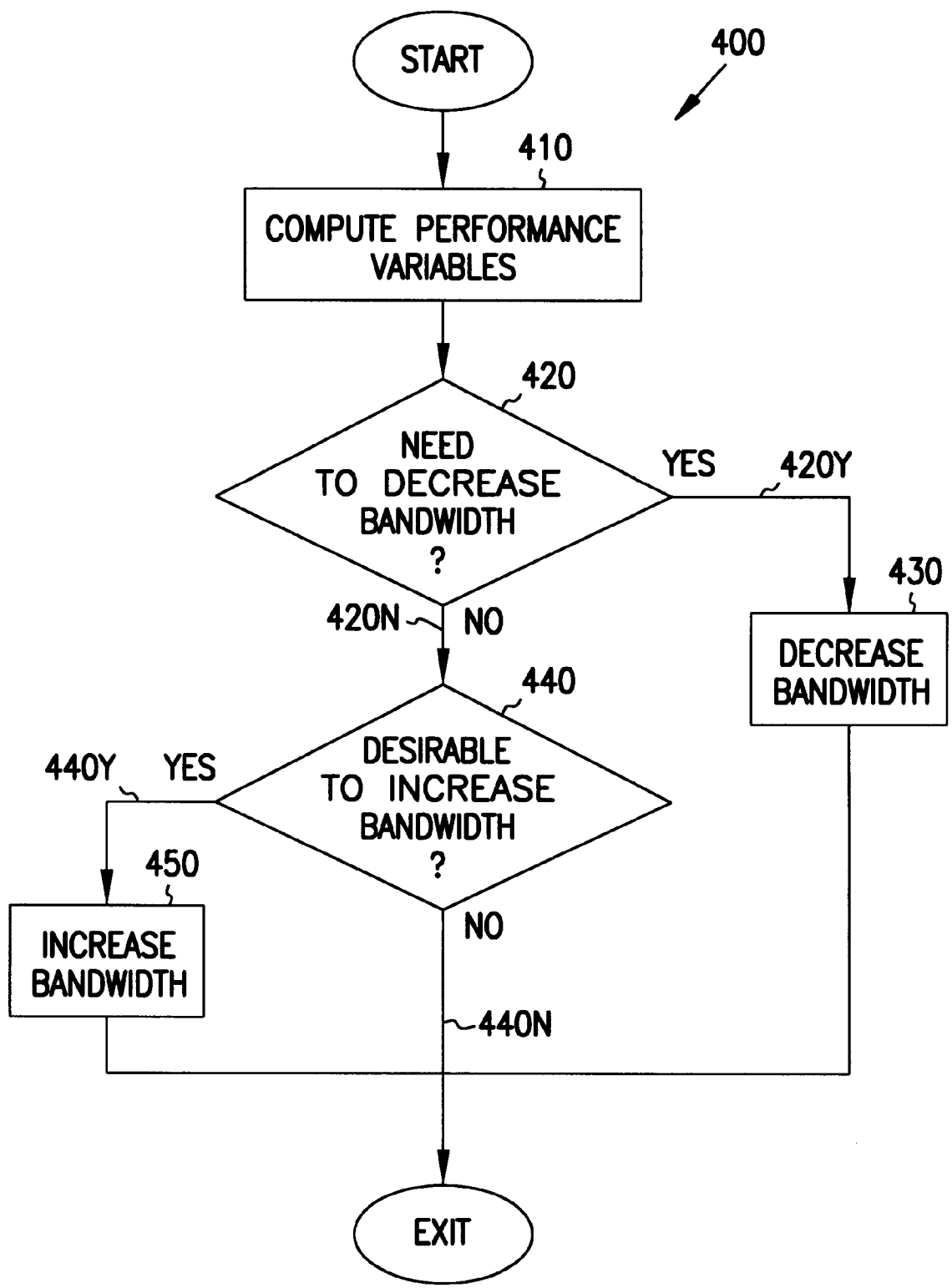
FIG. 4 is a flowchart including steps 410, 420, 430, 440 and 450 which illustrate the Adjust_Bandwidth procedure of one embodiment of the present invention.

In accordance with one aspect of the present invention, client computer 240 dynamically adjusts the transmission rate of the data stream to optimize usage of the bandwidth capacity of the network connection. Note that in the following examples, within the context of server 220 and client computer 240, the term "bandwidth" is synonymous to the "transmission rate". FIG. 4 is a flowchart including steps 410, 420, 430, 440 and 450 which illustrate the Adjust_Bandwidth procedure of one embodiment of the present invention.

In this example, the performance bottleneck is the bandwidth capacity of the network connection, and a transmission rate, sustainable by the network connection, is dynamically selected from a plurality of discrete bit rates, e.g., 14 kbps, 18 kbps, . . . These bit rates are exemplary and other discrete bit rate values are possible. In addition, the present method for dynamically selecting a suitable bandwidth among a plurality of discrete bit rate values can also be adapted for dynamically selecting a suitable bandwidth within a continuous range of bit rate values.

FIGS. 5A, 5B, 5C, 5D and 5E, are detailed flowcharts illustrating steps 410, 420, 430, 440 and 450, respectively, of FIG. 4. In step 410, the performance variables are computed. Next, in step 420, the computed performance variables are used to determine if it is desirable to decrease the bandwidth, and if so, then in step 430, the bandwidth is decreased. If a bandwidth decrease is not desirable, then in step 440, the performance variables are used to determine if it is desirable to increase the bandwidth. If a bandwidth increase is desirable, then in step 450, the bandwidth is increased.

Figure 5A:
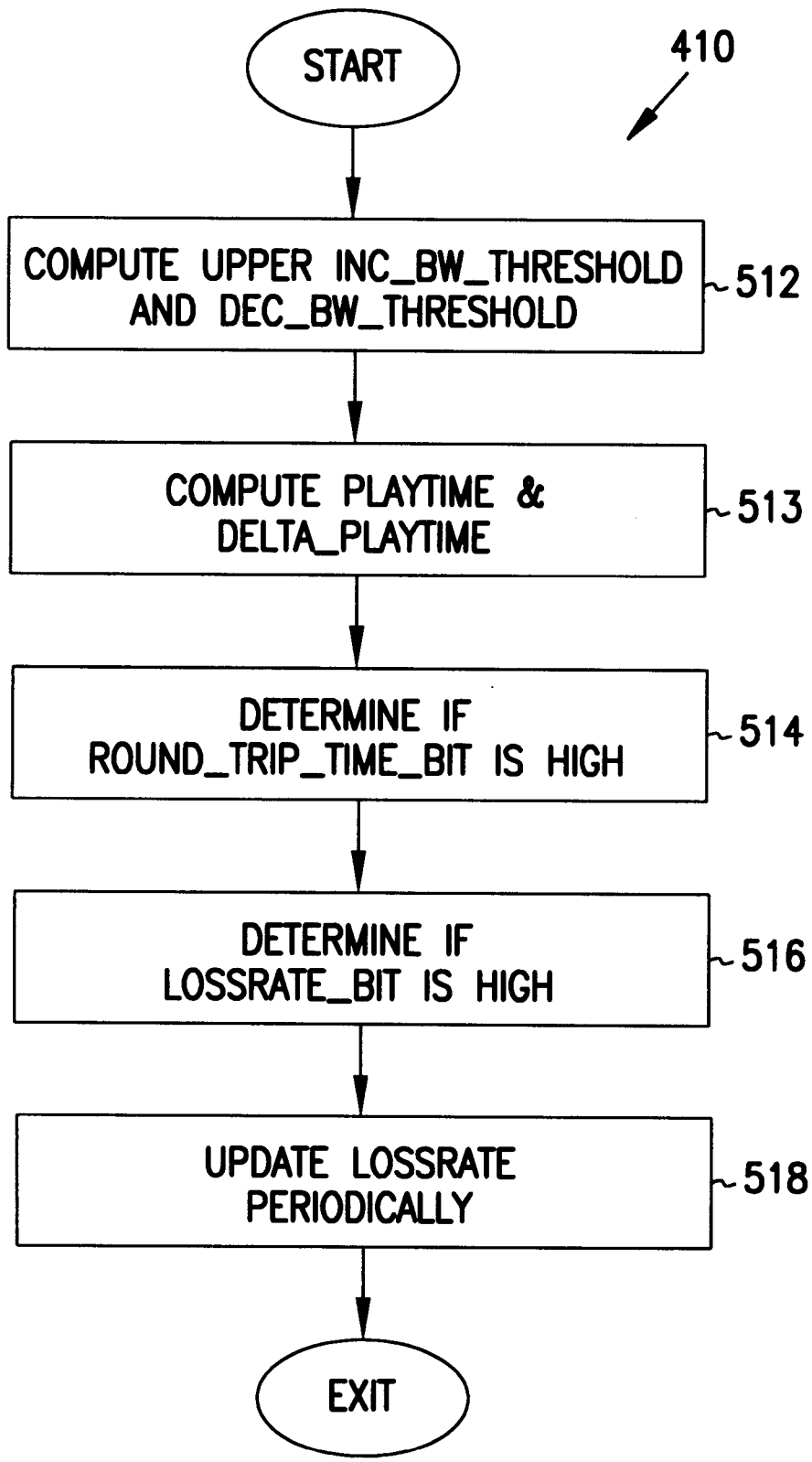
FIGS. 5A, 5B, 5C, 5D and 5E, are detailed flowcharts illustrating steps 410, 420, 430, 440 and 450, respectively, of FIG. 4.
Figure 5B:
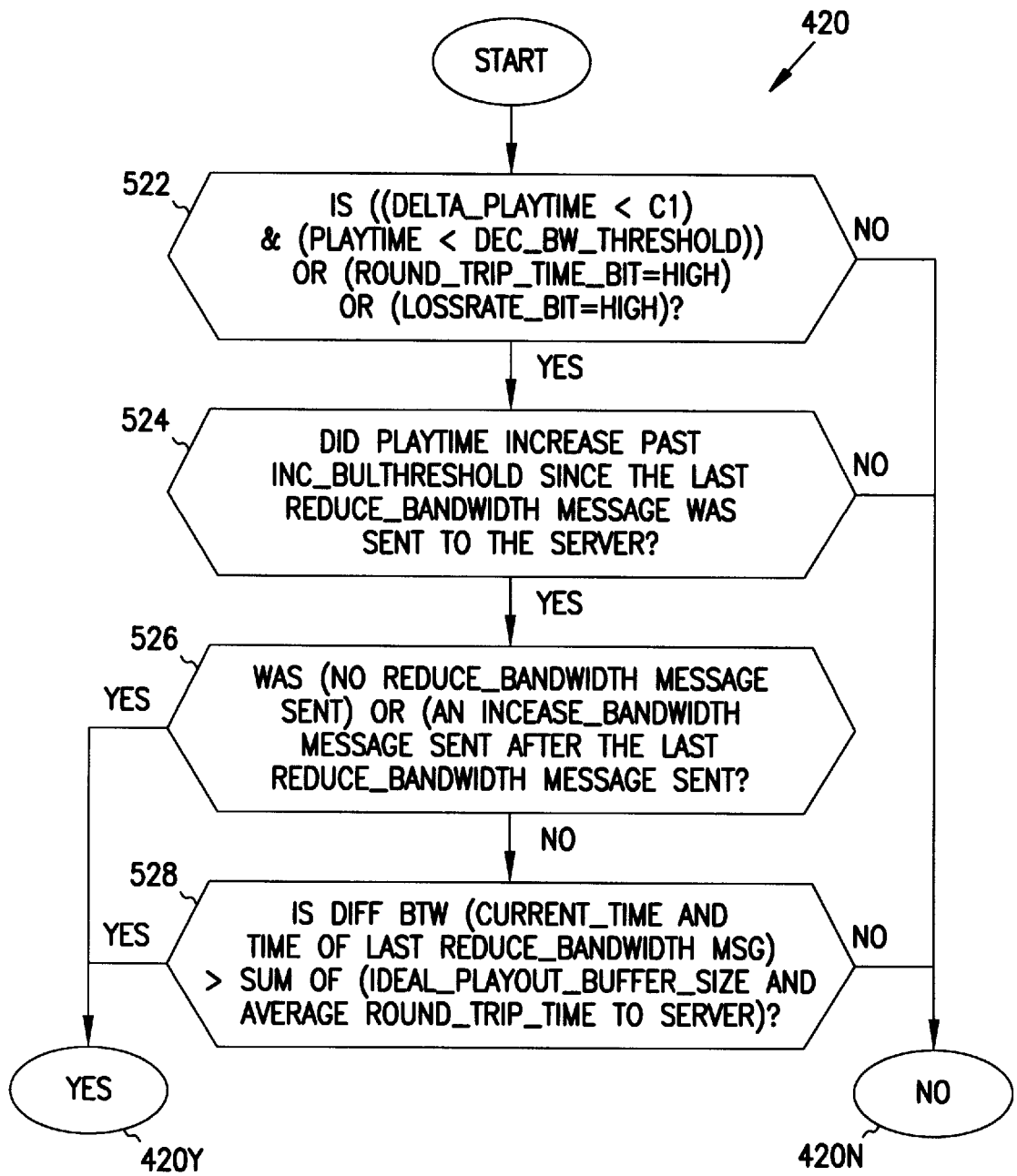

Referring now to FIG. 5A (step 410), performance variables are computed. In step 512, an Upper Increase_Bandwidth (INC_BW) threshold and a Decrease_

Bandwidth (DEC_BW) threshold are computed. Next, variables Playtime and Delta_Playtime are computed (step 513). In steps 514 and 516, client computer 240 determines if Round_Trip_Time_Bit and Lossrate_Bit are high, respectively. In step 518, the Lossrate is updated periodically.

Figure 6A:
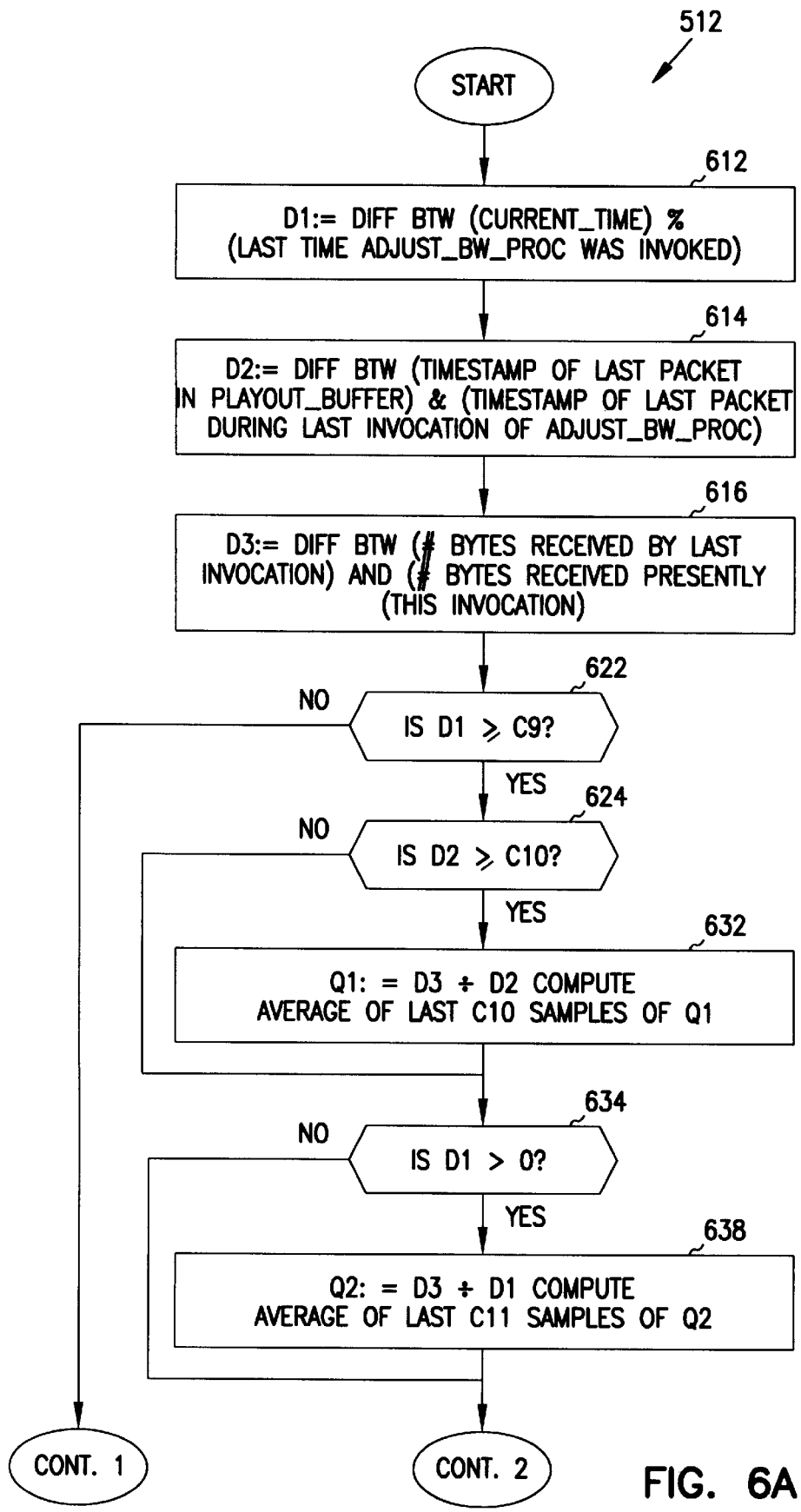
FIGS. 6A and 6B are two halves of a flowchart illustrating the dynamic determination of the Upper INC_BW threshold and the DEC_BW threshold.
Figure 6B:
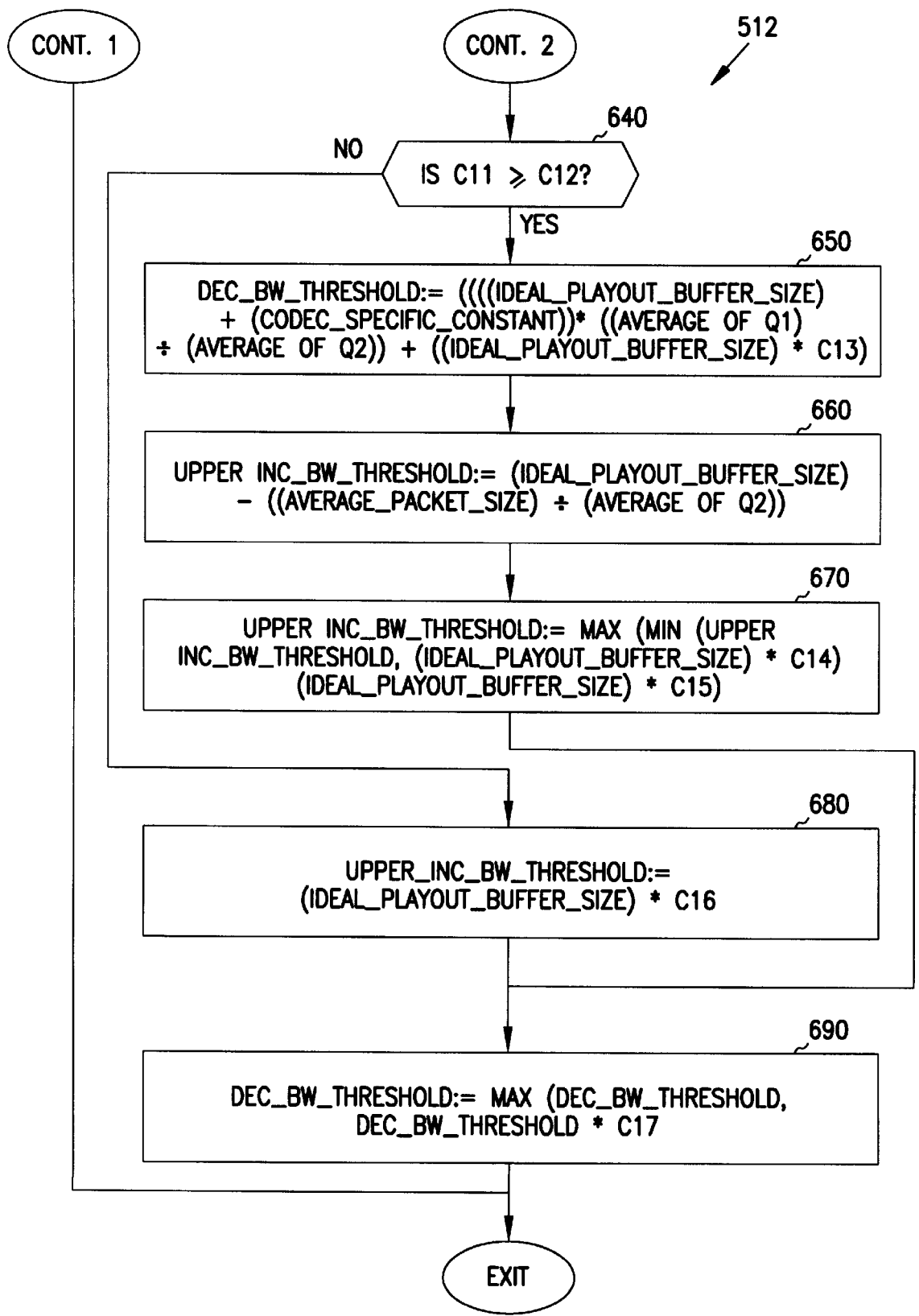

FIGS. 6A and 6B are two halves of a flowchart illustrating the dynamic determination of the Upper INC_BW threshold and the DEC_BW threshold, step 512 in greater detail. In step 612, the difference (D1) between the Current_Time and the previous time the dynamic bandwidth selection method was invoked is computed. In step 614, the difference (D2) between the timestamp of the last data packet currently in playout buffer 366 and the timestamp of the last data packet in playout buffer 366 during the previous invocation of the Adjust_Bandwidth procedure, is computed. In step 616, the difference (D3) between the number of bytes received by the previous invocation and the number of bytes currently received (by the current invocation) is computed.

If D1 is greater than a constant C9, e.g., 2.5 seconds, and D2 is greater than a constant C10, e.g., 1.5 seconds, (steps 622 & 624), then client computer 240 computes an average of the last C10 samples, e.g., ten samples, of the quotient (Q1) from a division of D3 by D2 (step 632). If D1 is greater than zero (step 634), then an average of the last C11 samples of the quotient (Q2) from a division of D3 by D1 is computed (step 638).

If C11 is greater than C12, e.g., if the number of samples is greater than 3, then the DEC_BW threshold and the Upper INC_BW threshold are dynamically adjusted using the following equations 650, 660, 670 & 690:

DEC_BW threshold (eqn 650) :=
  ((((Ideal_Playout_Buffer_size) +
  (Codec_Specific_Constant)) *((Average of Q1) − (Average of Q2)))
  /(Average of Q2)) + ((Ideal_Playout_Buffer_Size) * C13)
DEC_BW threshold (eqn 690) :=
  Max (DEC_BW threshold, DEC_BW threshold * C17)
Upper INC_BW threshold (eqn 660) := (Ideal_Playout_Buffer_Size) −
  ((Average_Packet_Size) / (Average of Q2))
Upper INC_BW threshold (eqn 670) :=
  Max (Min (Upper INC_BW threshold,
  (Ideal_Playout_Buffer_Size) * C14),
  (Ideal_Playout_Buffer_Size) * C15)

Wherein, C13 is 0.25, C14 is 0.95, C15 is 0.60, and C17 is 0.20. The Codec_Specific_Constant is dependent on the specific codec, e.g., for H263 the constant is 6400 milliseconds (ms).

Else if C11 is less than C12, then the DEC_BW threshold and the Upper INC_BW threshold are dynamically adjusted using the following equations 680, 690:

Upper INC_BW threshold (eqn 680) := (Ideal_Playout_Buffer_Size)
  * C16
DEC_BW threshold (eqn 690) :=
  Max (DEC_BW threshold, DEC_BW threshold * C17)

Wherein C14 is 0.95, C15 is 0.60, and C16 is 0.60.

Figure 7A:
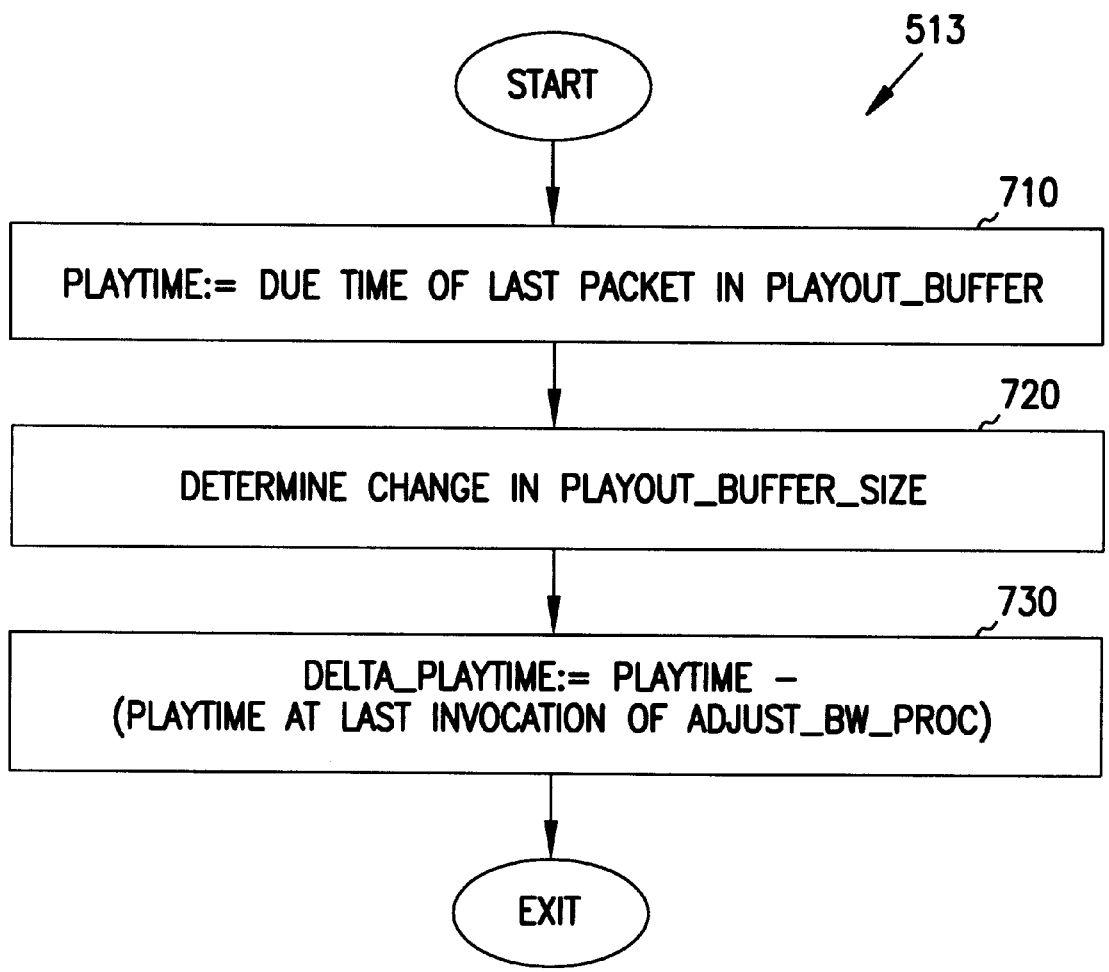
FIG. 7A is a flowchart illustrating the computation of variables Playtime and Delta_Playtime of the playout buffer.

FIG. 7A is a flowchart illustrating the computation of variables Playtime and Delta_Playtime, step 513, in greater detail. In step 710, Playtime is set to the Duetime of the last packet in playout buffer 366. The computation of the Duetime is described in greater detail in steps 712–718 below. Client computer 240 determines the change in the Playout_Buffer_Size (step 720). The Delta_Playtime is set to the difference between the current Playtime and the Playtime at the previous invocation of the Adjust_Bandwidth procedure (step 730). Variables Playtime and Delta Playtime provide exemplary absolute and relative measures, respectively, of the Playout_Buffer_Size, the number of data packet(s) in playout buffer 366.

Figure 7B:
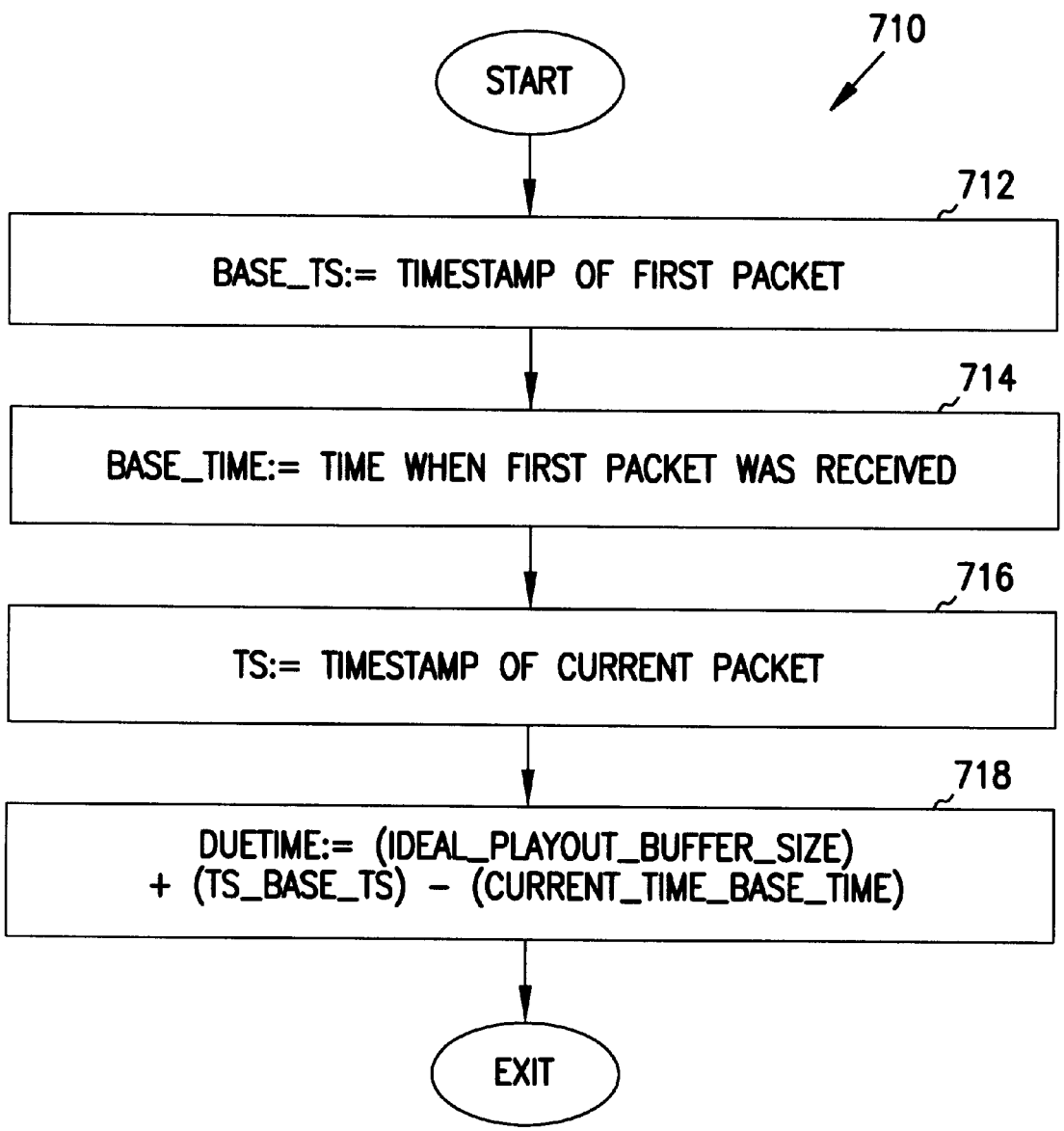
FIG. 7B illustrates the determination of the Duetime of a data packet.

FIG. 7B illustrate the determination of the Duetime of a data packet (step 710). First, the Base_TS is set to the timestamp of the first packet received by client computer 240 (step 712). The Base_Time is set to the time when the first packet was received (step 714). The TS is set the the timestamp of the data packet of interest (step 716). The Duetime of the packet of interest is computed using the following equation 718:

Duetime := (Ideal_Playout_Buffer_Size) +
$$(TS − Base\_TS) − (Current\_Time − Base\_Time)$$

Figure 8:
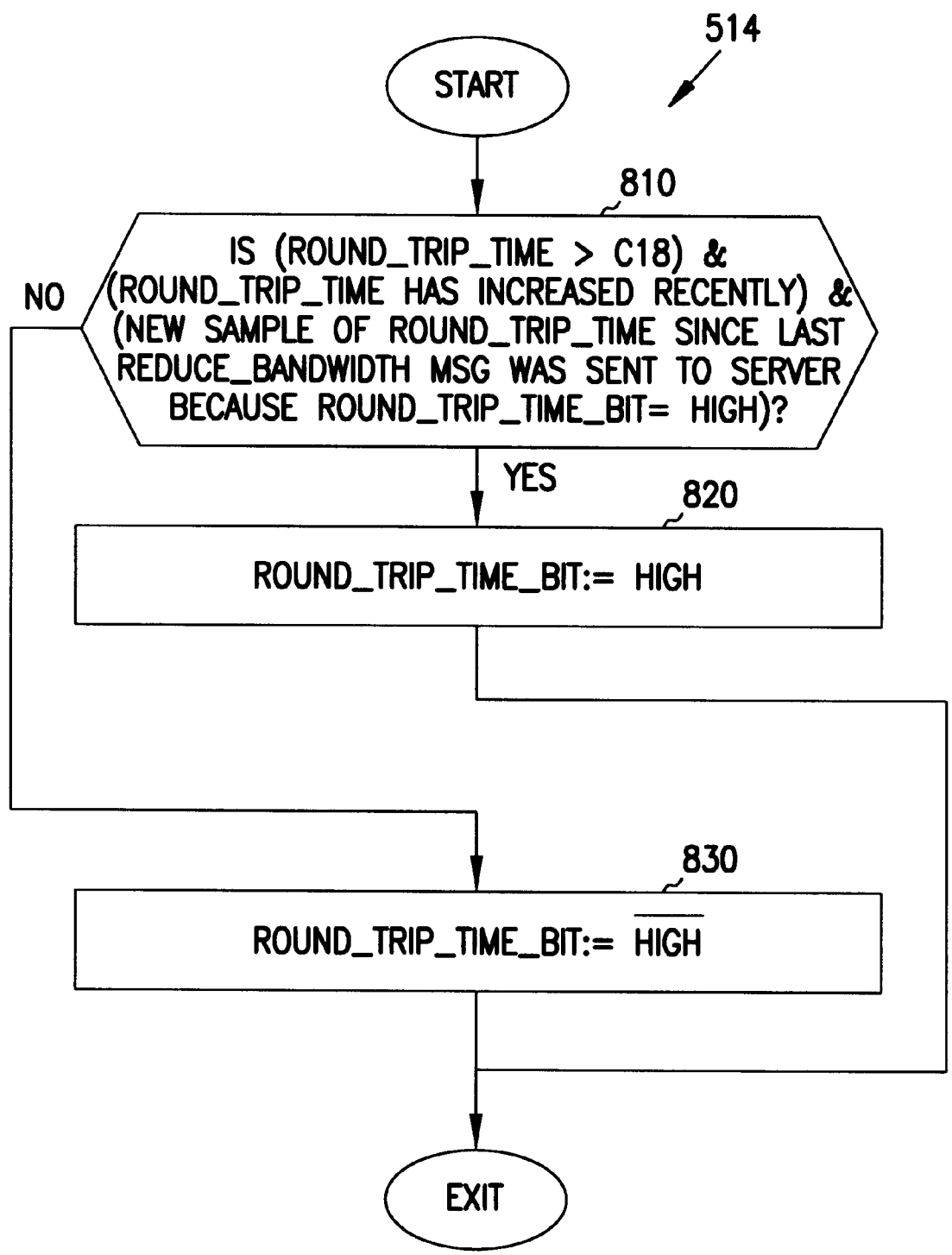
FIG. 8 is a flowchart showing the determination of the Round_Trip_Time_Bit.

As shown in FIG. 8, in step 514, client computer 240 determines if Round_Trip_Time_Bit should or should not be set to High. The boolean equation 810 used for the determination is:

(Round_Trip_Time > C18) &

(Round_Trip_Time has increased over the last C19 samples) &

(New sampling of Round_Trip_Time occured since the previous

Reduce_Bandwidth message was sent to the server because the

Round_Trip_Time_Bit was set to High)

Wherein C18 is 4 seconds, and C19 is 3 samples.

Figure 9:
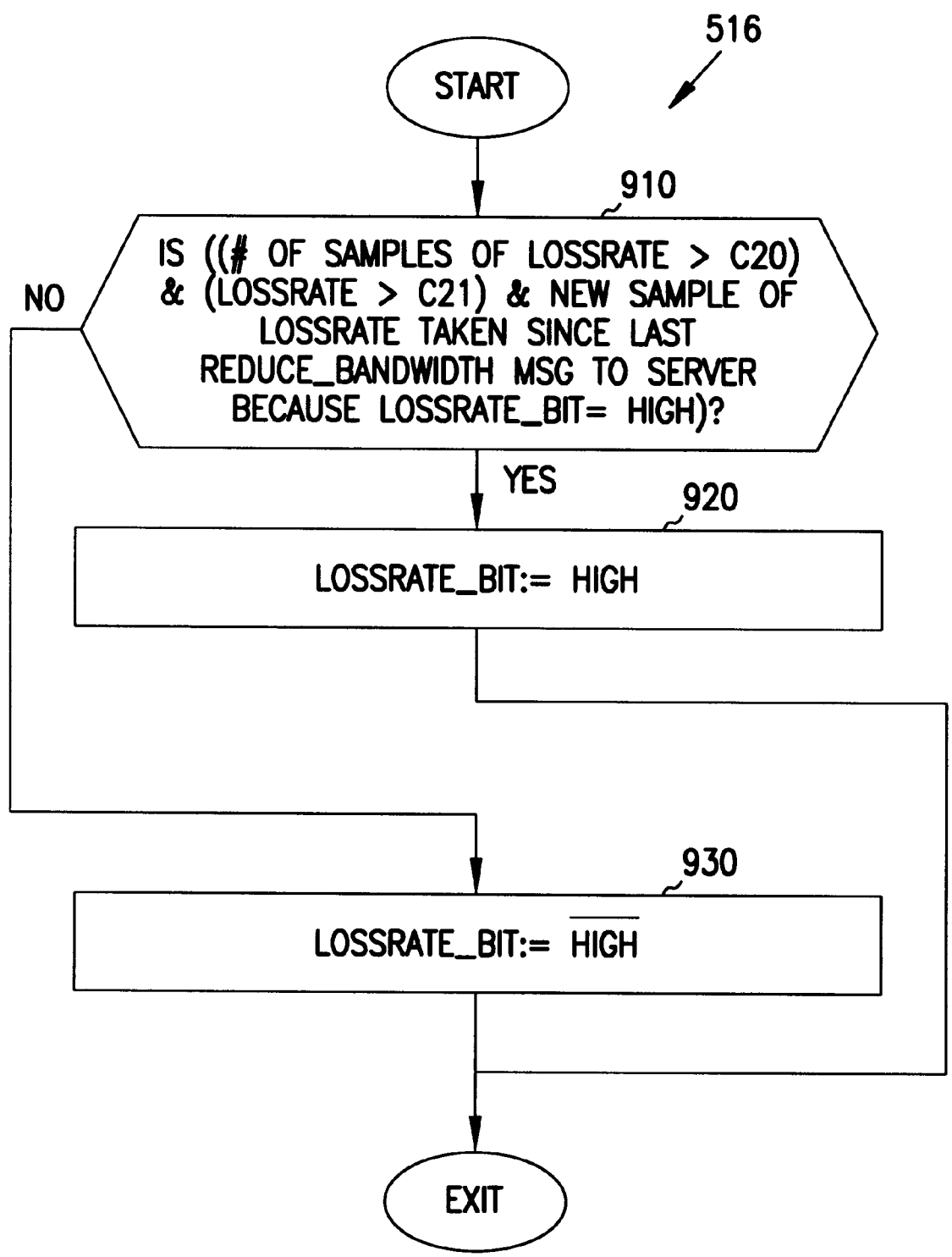
FIG. 9 is a flowchart showing the determination of the Lossrate_Bit.

In step 516 of FIG. 9, a determination of whether Lossrate_Bit should be set to High. The boolean equation 910 used is for the determination:

(Number of samples of Lossrate > C20) & (Lossrate > C21) &

(a new sample of Lossrate was taken since the last Reduce_Bandwidth message was sent to the server because the Lossrate_Bit was High)

Figure 10:
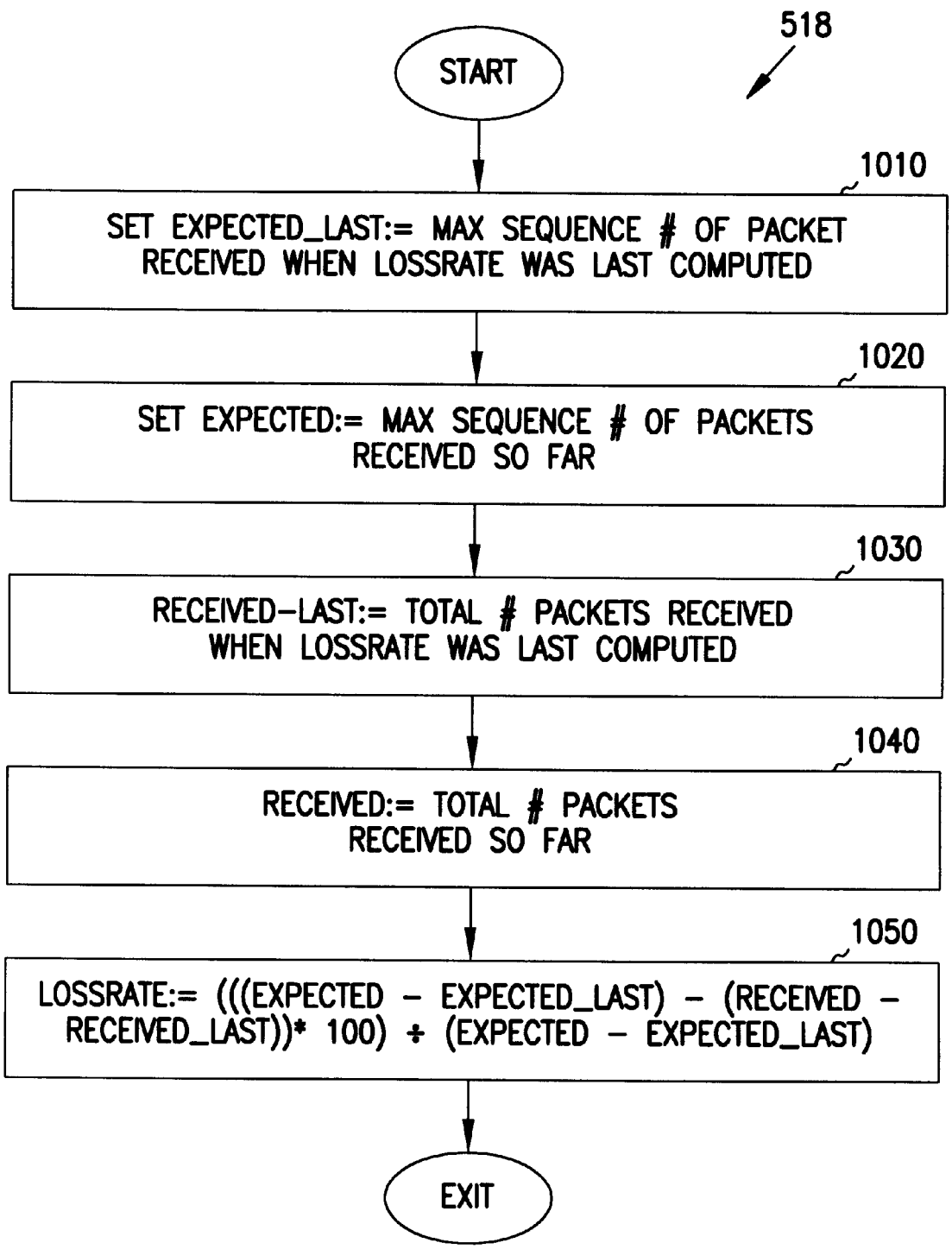
FIG. 10 illustrates a periodic update of Lossrate.

FIG. 10 shows step 518 which updates Lossrate periodically. In steps 1010 and 1020, Expected_Last is set to the maximum sequence number among the packets received when Lossrate was last computed, and Expected is set to the maximum sequence number among the packets currently received. Received_Last is set to the total number of packets received when Lossrate was last computed (step 1030), and Received is set to the total number of packets currently received (step 1040).

The Lossrate is then computed using the following equation 1050:

Lossrate :=
  (((Expected − Expected_Last) − (Received − Received_Last))*100)/
  (Expected − Expected_Last)

Referring back to FIG. 5B, in step 420, client computer 240 uses the performance variables to determine if the bandwidth should be decreased. In this implementation, a conservative approach is taken, i.e., the bandwidth is decreased whenever a bandwidth reduction appears to be required. Such a conservative approach reduces the probability of an overrun of playout buffer 366 and the consequential loss of packets.

Using the boolean equation 522:

$$((\text{Delta\_Playtime} < C1) \text{ \& } (\text{Playtime} < \text{DEC\_BW threshold}))$$
$$\text{OR } (\text{Round\_Trip\_Time\_Bit} = \text{High}) \text{ OR } (\text{Lossrate\_Bit} = \text{High})$$

Wherein C1=100 ms

If equation 522 is True, then playout buffer 366 is permitted to stabilize prior to sending any successive Decrease_Bandwidth messages. As discussed above, Playtime and Delta_Playtime provide measures of the number of packet(s) in playout buffer 366.

If Playtime did not increase past the Upper INC_BW threshold since the previous Reduce_Bandwidth message was sent (step 524), then client computer 240 permits playout buffer 366 to stabilize at the current bandwidth.

If client computer 240 has not previously sent a Decrease_Bandwidth message or client computer 240 has sent an Increase_Bandwidth message since the last Decrease_Bandwidth message was sent (step 526), then step 430 is invoked (420y). Conversely, if the difference between the Current_Time and the time the last Decrease_Bandwidth message was sent is greater than the sum of the Ideal_Buffer_Size and the average Round_Trip_Time to stream server 220 (step 528), then step 430 is invoked (420y).

Figure 5C:
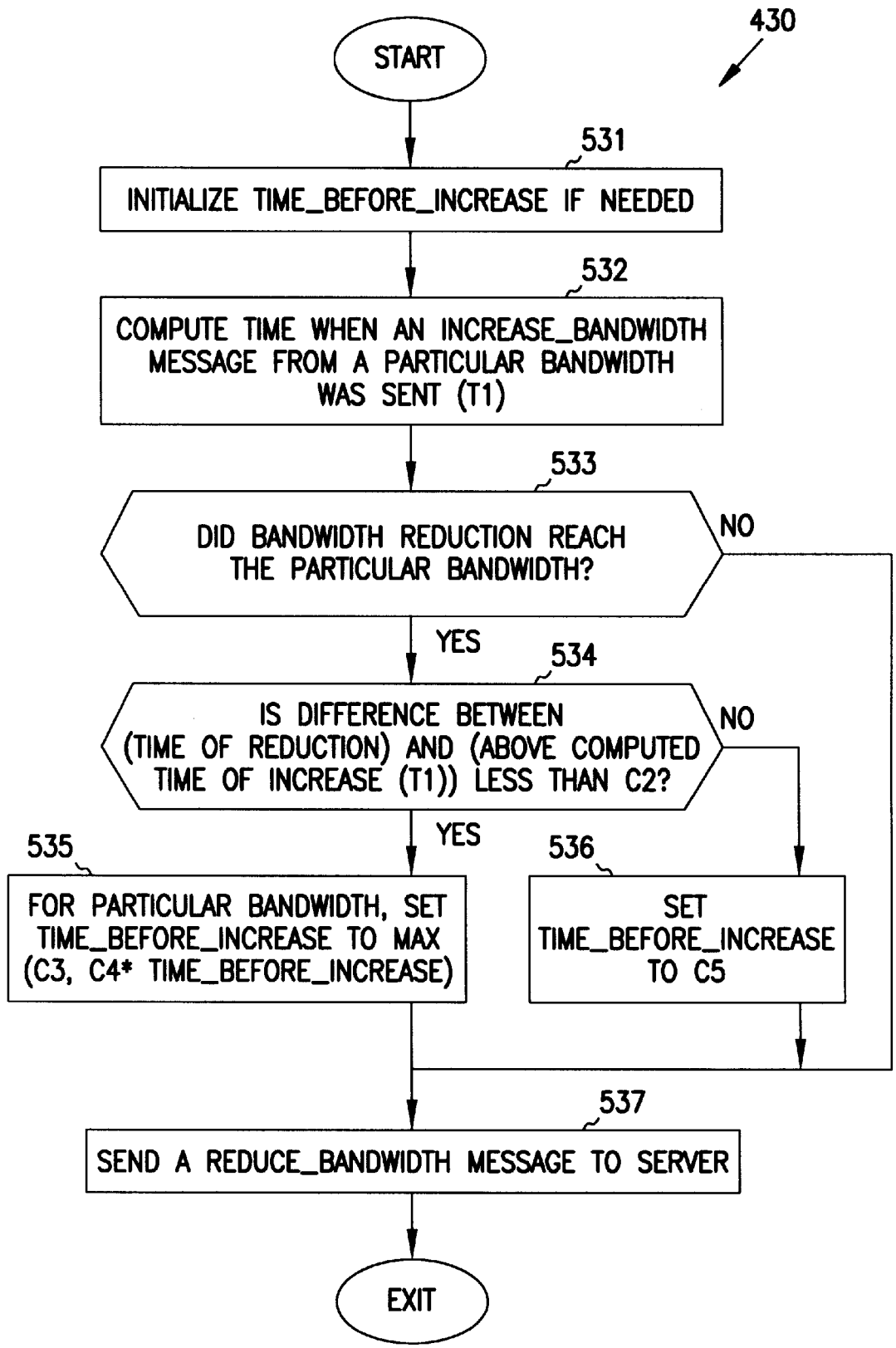

As shown in FIG. 5C, in step 430, client computer 240 has determined that a network bandwidth decrease is desired (420y). A Time_Before_Increase variable is maintained for each discrete bandwidth point (discrete bandwidth value), and these variables are initialized to a suitable value, C5, e.g., 10 seconds (step 531). For each bandwidth point, the Time_Before_Increase value determines the time period for which Playout_Buffer_Size should stay above a Lower INC_BW threshold, e.g., 75% of the Ideal_Playout_Buffer_Size, before an Increase_Bandwidth message is sent. In other words, for each bandwidth point, the variable Time_Before_Increase determines the minimum waiting period prior to the sending of an Increase_Bandwidth message to server 220.

Client computer 240 determines the time, T1, when an Increase_Bandwidth message from a particular bandwidth was sent (step 532). If the present bandwidth reduction reached the particular bandwidth (step 533), then client computer 240 computes the difference between the time of such a reduction and T1 (step 534), else client computer 240 sends a Decrease_Bandwidth message to stream server 220 (step 537). The Adjust_Bandwidth procedure is now completed for the current invocation.

In step 534, if the computed difference between the time of the reduction and T1 is less than C2, e.g., 80 seconds, then for the particular bandwidth, the Time_Before_Increase is set to the maximum of (C3, C4 * Time_Before_Increase) (step 535). Conversely, if the difference is greater than C2, then the Time_Before_Increase is reset to C5, e.g., 10 seconds (step 536). In this example, C3=180 and C4=1.75.

After step 535 or 536, client computer 240 sends a Decrease_Bandwidth message to stream server 220 (step 537). If the underlying transmission protocol between client computer 240 and server 220 is HTTP, then commands, such as the Decrease_Bandwidth message can be sent from client computer 240 to stream server 220 within a HTTP "post" packet. The Adjust_Bandwidth procedure is now completed for the current invocation.

Figure 5D:
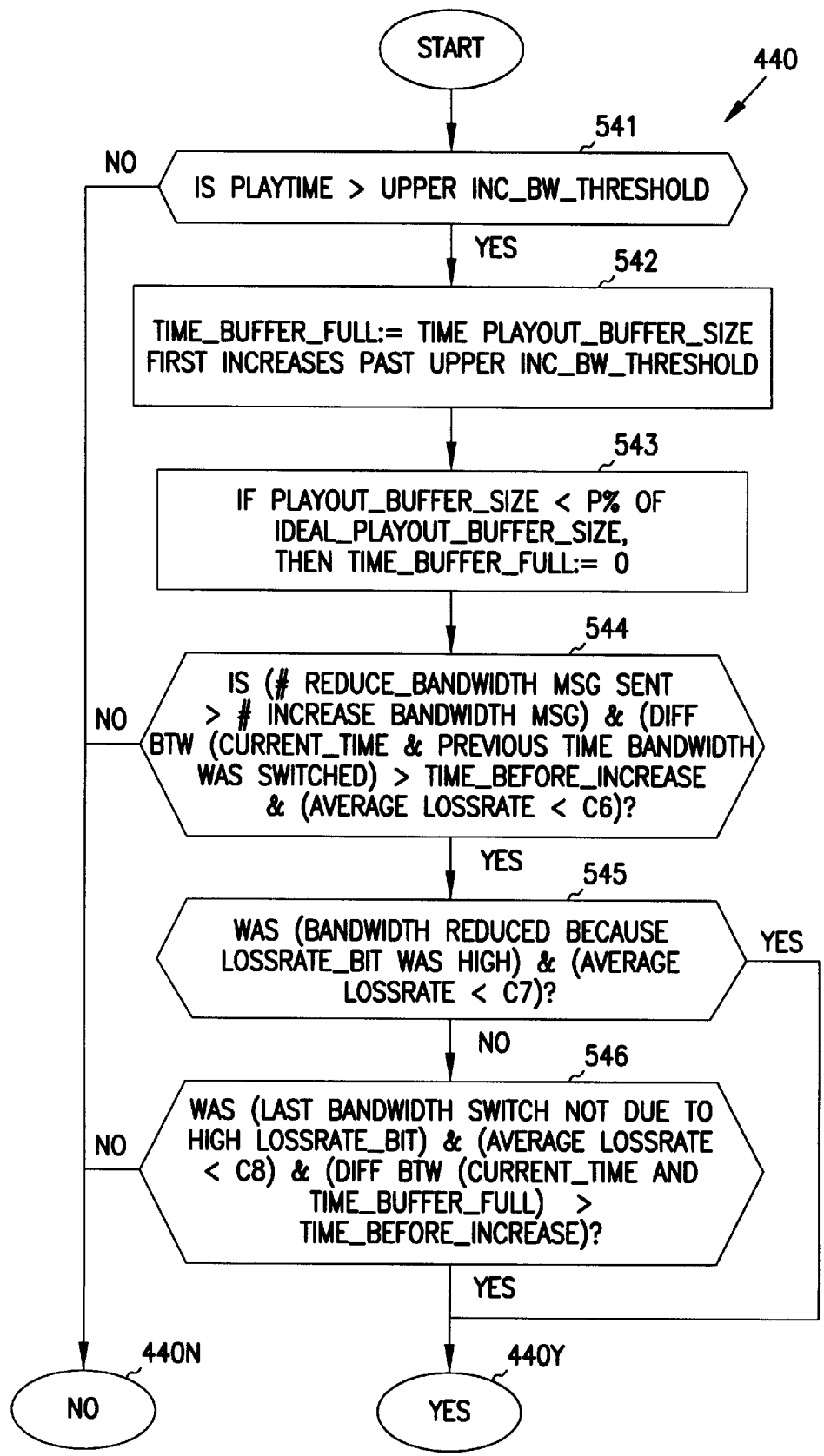

Referring now to FIG. 5D, if a bandwidth decrease is not desirable (420n), then in step 440, the performance variables are used to determine if it is desirable to increase the bandwidth. In this conservative approach, if the Playout_Buffer_Size exceeds the Upper INC_BW threshold and continues to stay above the Lower INC_BW threshold for the INC_BW wait period, then the bandwidth is increased. In other words, the bandwidth is increased only when there is a fairly high probability that the next higher bandwidth will be sustainable by computer network 290. Hence, the Lower_INC_BW threshold requirement reduces the probability of the selected bandwidth oscillating rapidly between two bandwidth points and possibly causing jitter.

Accordingly, in step 541, if Playtime is greater than the Upper INC_BW threshold, then the Time_Buffer_Full is set to the time when the Playout_Buffer_Size first increased past the Upper INC_BW threshold (step 542). In step 543, whenever the Playout_Buffer_Size drops below the Lower INC_BW threshold, e.g., 75% of the Ideal_Playout_Buffer_Size, the Time_Buffer_Full is reset to zero. Next, client computer 240 determines if the following Boolean equation 544 is True:

(# of Decrease_Bandwidth message(s) sent to the server is greater than
# of Increase_Bandwidth message(s) sent to the server) &
(Difference between the Current_Time & the last time the bandwidth was switched (to the current bandwidth) is greater than the Time_Before_Increase) &
(The average Lossrate is less than C6)

Wherein C6=10

If equation 544 is true, then client computer 240 determines if the previous reduction of bandwidth was because the Lossrate_Bit was High and the average Lossrate is less than C7, e.g., 5 (step 545). If step 545 is true, client computer 240 proceeds with an increase of the bandwidth (440y).

Conversely, if step 545 was not True, then client computer 240 determines if the following boolean equation 546 is True:

(Previous bandwidth switch was not due to a High Lossrate_Bit) &
(Average Lossrate is less than C8) &
((Difference between the Current_Time and the Time_Buffer_Full) is greater than (the Time_Before_Increase))

wherein C8=10

If equation 546 is True, then client computer 240 proceeds with an increase of the bandwidth (440y). Otherwise, the Adjust_Bandwidth procedure is now completed for the current invocation.

Figure 5E:
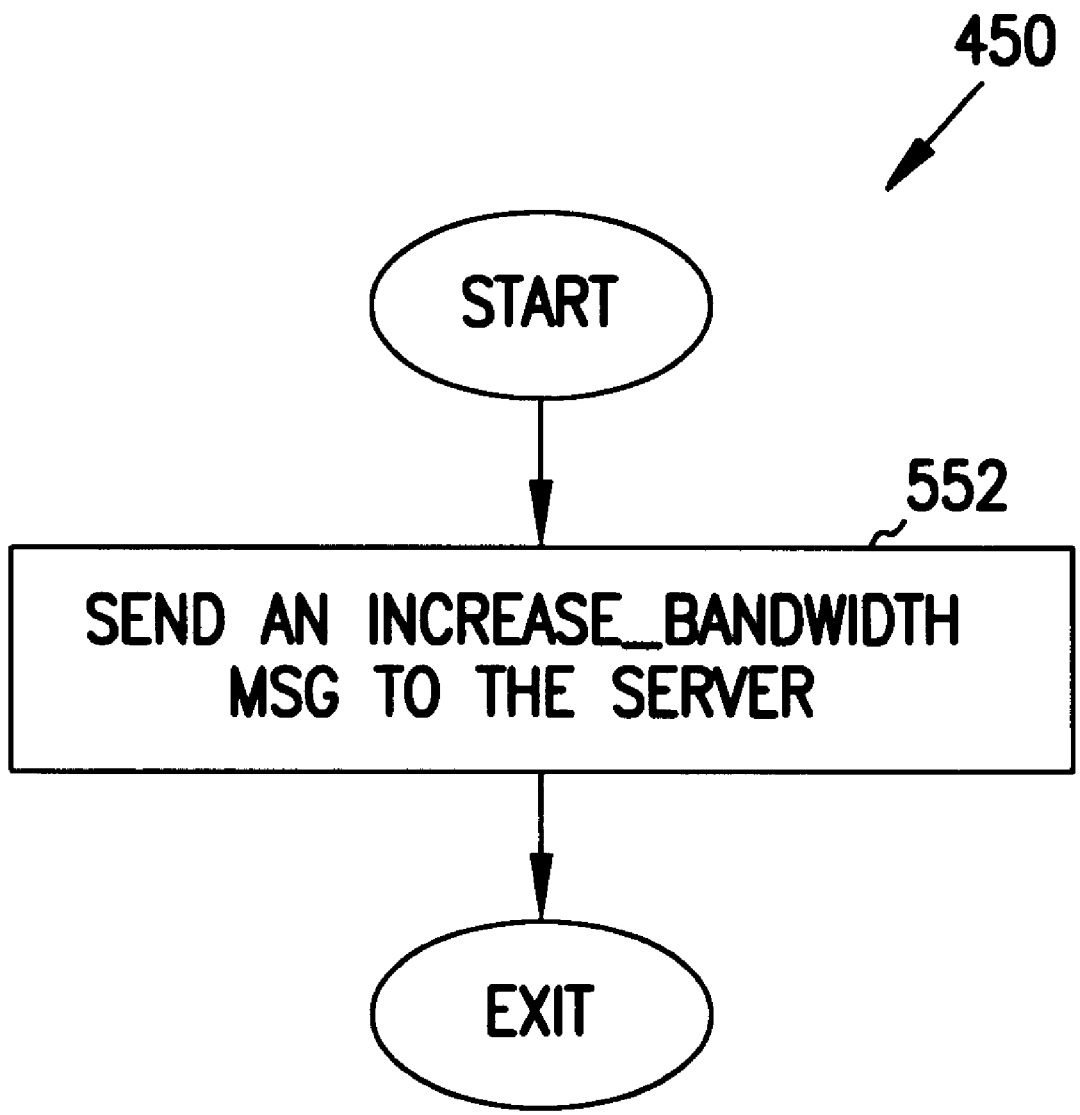

In FIG. 5E, if a bandwidth increase is desirable (440y), then in step 450, the bandwidth is increased. Client computer 240 sends an Increase_Bandwidth message to stream server 220. The Adjust_Bandwidth procedure is now completed for the current invocation.

Figure 11:
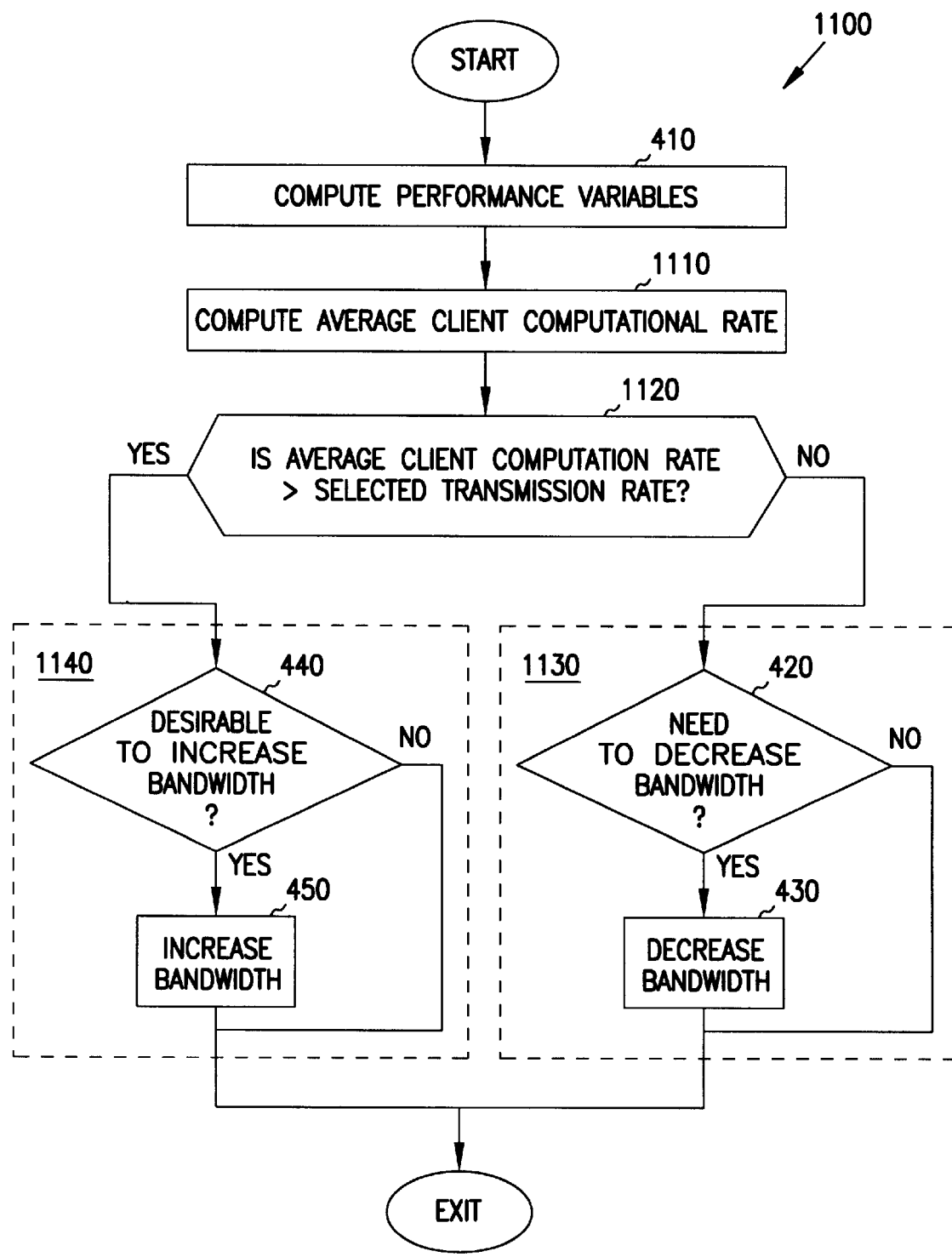
FIG. 11 is a flowchart showing a dynamic bandwidth selection which optimizes the computational capacity of the client computer and which is also sustainable by the network connection.

In accordance with another aspect of the present invention, as shown in FIG. 11, client computer 240 dynamically selects a suitable bandwidth which optimizes the computational capacity of client computer 240 and which is also sustainable by the network connection. In this example, the bottleneck is the client computer's computational bandwidth.

First, client computer computes the performance variables (step 410 of FIG. 4), and also computes an average client packet computational rate which is the rate client computer 240 is able to decompress and render all the incoming data packets without loss (step 1110). Next, client computer 240 determines if the average client packet computational rate is higher than, equal to or lower than the selected bandwidth, i.e., selected transmission rate (step 1120). In other words, on the average, are the data packets arriving at client computer 240 at a faster, equal or slower rate than client computer 240 is able to decompress and render the data packets.

If the selected bandwidth is higher than the average client computation rate, buffer 366 will eventually overflow and data packets will have to be discarded. Accordingly, a lower bandwidth, less than or equal to the average computation rate of client computer 240, is selected (step 1130). Such a bandwidth decrease can be implemented using the method described above and illustrated by steps 420, 430 of the flowchart of FIG. 4.

Conversely, if the average client packet computational rate is higher than the selected bandwidth, then a higher bandwidth may be selected, subject to the bandwidth capacity of the network connection (step 1140). Such a network bandwidth increase can be implemented using the method described above and illustrated by steps 440, 450 of the flowchart of FIG. 4.

Figure 12:
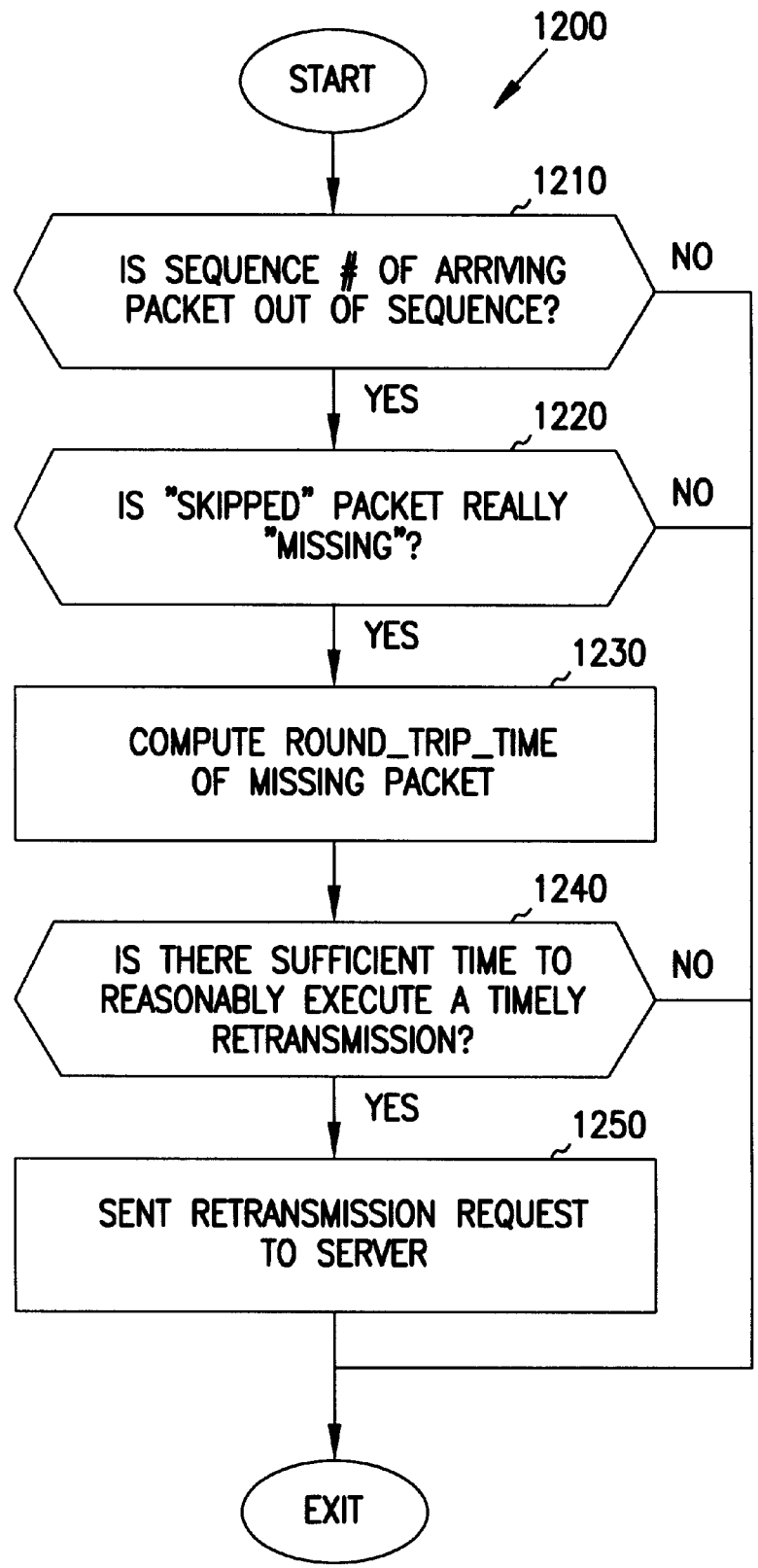
FIG. 12 is a flowchart illustrating the selective retransmission of the present invention.

In accordance with yet another aspect of the invention, as shown in FIG. 12, client computer 240 selectively requests retransmission of "missing" data packets for just-in-time (JIT) reliability. As data packets arrive at client computer 240, their sequence numbers are checked (step 1210). If a data packet arrives out of sequence, e.g., data packet #n+2 arrives after data packet #n, client computer 240 checks playout buffer 366 to see if the "skipped" packet, e.g., packet #n+1, is indeed "missing", or if the skipped packet has arrived previously and is already stored in playout buffer 366 (step 1220).

If the skipped data packet #n+1 is not found in playout buffer 366, i.e., packet #n+1 is missing, client computer 240 computes a Round_Trip_Time for the missing data packet #n+1. The Round_Trip_Time is an estimate of the time beginning from the time a retransmission request is sent to stream server 220 till the time a copy of the missing data packet is received at client computer 240 in response to the retransmission request (step 1230).

If there is sufficient time to reasonably execute a timely retransmission, e.g., the difference between the timestamp of the missing data packet and the timestamp of the currently displayed data packet is greater than the Round_Trip_Time (step 1240), then client computer 240 sends a request to server 220 for a retransmission of the missing data packet (1250). As discussed above, if the underlying transmission protocol between client computer 240 and server 220 is HTTP, then commands, such as the retransmission request can be sent from client computer 240 to stream server 220 within a HTTP "post" packet.

Conversely, if there is insufficient time remaining to reasonably expect a timely retransmission, then the data packet is presumed "unrecoverable". By selectively requesting retransmission, data packets which do not have a reasonable chance for a successful retransmission are discarded, thereby reducing network traffic due to late retransmissions and further improving network efficiency.

The above described selective retransmission algorithm, an application-level framing (ALF) based algorithm, is advantageous over a conventional automatic retransmission algorithm based on a full-blown multi-layer protocol model, e.g., the OSI 7-layer networking model, with accompanying strictly layered functional divisions and related interfaces. This is because vertical control across a structured multi-layer protocol is neither easy to implement nor efficient. In contrast, a simple protocol, e.g., RTP over UDP without high level integrated packet reliability, is easier to implement efficiently than for example TCP or HTTP over TCP.

The present invention may also be practiced with the prioritization of retransmission based on data types of the data packets. For example, since parent I frames are needed to render dependent child P frames, data packets which include I frame(s) should assigned higher priority for transmission and/or retransmission over data packets which include only P frame(s).

Priority can also be determined via a scalable layered protocol based on parameters such as resolution or frame rate. For example, the data packets for rendering the base (lowest) resolution is given the highest priority while additive data packets for improving the base resolution are given lower priority.

Other modifications to the above described algorithm are also possible. For example, instead of the less flexible rule of step 1140, the present invention may also incorporate selective late retransmission. Hence, even when there is insufficient time remaining for a timely retransmission, instead of dropping the missing data packet, client computer 240 may decide to temporarily halt the video/audio stream for a brief interval to wait for retransmission of the relatively important missing data packet. For example, if the audio stream is compressed and packaged into 1.6 to 2 seconds sized packets, it is preferable to pause the video/audio streams for 0.2 seconds than to lose over a second of audio information.

Similarly, since it is visually acceptable to momentarily freeze a ticker tape display or slightly delay a HTML page change, annotation stream packets are also suitable for selective late retransmissions. For example, a late retransmission of a missing annotation stream packet, which includes important HTML flip(s), may be preferred to dropping the important annotation stream packet.

Data-type adaptability can also be incorporated into the selective retransmission protocol of the present invention. For example, if there is a missing P frame which is sequentially located just before an I frame, it may be expedient to drop the missing P frame and skip to the next I frame in buffer 366.

While this invention has been described in terms of several preferred embodiments, other alterations, permutations, and equivalents also fall within the scope of this invention. For example, one conservative approach is to start at a very low bandwidth and slowly increase the bandwidth. Another approach is to be optimistic and start at a high bandwidth and then rapidly decrease the bandwidth to match the network capability. Hence, there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a client computer, a method for selectively retransmitting missing data packets of a data stream from a server to said client computer via an unreliable computer network, the method useful in association with an on-demand application of said client computer, the client computer including a playout buffer for storing a plurality of data packets of said data stream being transmitted from the server to the client computer, the method comprising:

(a) detecting that a first said missing data packet has not arrived at said client computer by a first expected time of arrival (ETA);

(b) computing a first Round_Trip_Time for said first missing data packet, the first Round_Trip_Time being an estimate of a period beginning from a time a first retransmission request is sent from the client computer to the stream server till a time a copy of said first missing data packet is received at the client computer from the stream server in response to the first retransmission request;

(c) computing a first time remaining before said first missing data packet is due for processing by said on-demand application; and (d) if said first Round_Trip_Time is less than said first time, then sending said first retransmission request packet to said server for said first missing data packet.

2. The method of claim 1 wherein if said first missing data packet is an important data packet, then the first retransmission request packet is sent to said server for said important first missing data packet, even if said first Round_Trip_Time is greater than the first time remaining before said first missing data packet is due for processing by said on-demand application.

3. The method of claim 2 wherein said data stream is a video stream and said first missing data packet includes an I video frame.

4. The method of claim 2 wherein said data stream is a video stream and said first missing data packet includes a base layer video frame.

5. The method of claim 2 wherein said data stream is an audio stream, said first missing data packet is an audio packet and a data size of said audio packet is greater than a first difference between the first Round_Trip_Time and the first time remaining before said first missing data packet is due for processing by said on-demand application.

6. The method of claim 1 further comprising:

(e) detecting that a second said missing data packet has not arrived at said client computer by a second ETA; and (f) computing a second Round_Trip_Time for said second missing data packet, the second Round_Trip_Time being an estimate of a period beginning from a time a second retransmission request is sent from the client computer to the stream server till a time a copy of said second missing data packet is received at the client computer from the stream server in response to the second retransmission request;

(g) computing a second time remaining before said second missing data packet is due for processing by said on-demand application; and (h) if said second Round_Trip_Time is less than the second time, and
  if said second missing data packet has a higher priority than said first missing data packet, then sending the second retransmission request packet to said server for said second missing data packet prior to step (d);
  else if second missing data packet has a lower priority than said first missing data packet, then sending the second retransmission request packet to said server for said second missing data packet after step (d).

7. The method of claim 6 wherein said priority of first and second missing data packets is based on the respective data type of said missing data packets.

8. The method of claim 6 wherein said first missing data packet includes an I video frame, said second missing data packet includes a P video frame, and hence said first missing data packet has a higher priority than said second missing data packet.

9. The method of claim 6 wherein said first missing data packet includes a base layer video frame, said second missing data packet includes an enhancement layer video frame, and hence said first missing data packet has a higher priority than said second missing data packet.

10. The method of claim 6 wherein a first difference between the first Round_Trip_Time and the first time remaining is less than a second difference between the second Round_Trip_Time and the second time remaining, and hence said first missing data packet has a higher priority than said second missing data packet.

11. The method of claim 10 wherein said data stream is a video data stream and wherein said first and said second missing data packets include video frames.

12. The method of claim 10 wherein said data stream is an annotation stream and wherein said first and second missing data packets include annotation frames.

13. A client computer useful in association with a stream server, said client computer coupled to said stream server via an unreliable computer network, the client computer comprising:

a playout buffer for storing a plurality of data packets of said data stream being transmitted from the server to the client computer, and wherein if a first said missing data packet has not arrived at said client computer by a first expected time of arrival (ETA) and if a first Round_Trip_Time of said first missing data packet is less than a first time remaining before said first missing data packet is due for processing by an on-demand application of said client computer, the first Round_Trip_Time being an estimate of a period beginning from a time a first retransmission request is sent to from the client computer to the stream server till a time a copy of said first missing data packet is received at the client computer from the stream server in response to the first retransmission request, then said first retransmission request packet is sent to said server for said first missing data packet.

14. The client computer of claim 13 wherein if said first missing data packet is an important data packet, then the first retransmission request packet is sent to said server for said important first missing data packet, even if said first Round_Trip_Time is greater than the first time remaining before said first missing data packet is due for processing by said on-demand application.

15. The client computer of claim 14 wherein said data stream is a video stream and said first missing data packet includes an I video frame.

16. The client computer of claim 14 wherein said data stream is a video stream and said first missing data packet includes a base layer video frame.

17. The client computer of claim 14 wherein said data stream is an audio stream, said first missing data packet is an audio packet and a data size of said audio packet is greater than a first difference between the first Round_Trip_Time and the first time remaining before said first missing data packet is due for processing by said on-demand application.

18. The client computer of claim 13 wherein if a second said missing data packet has not arrived at said client computer by a second ETA and if a second Round_Trip_Time is less than a second time remaining before said second missing data packet is due for processing by said on-demand application, the second Round_Trip_Time being an estimate of a period beginning from a time a second retransmission request is sent to from the client computer to the stream server till a time a copy of said second missing data packet is received at the client computer from the stream server in response to the second retransmission request, then:
  if said second missing data packet has a higher priority than said first missing data packet, then sending the second retransmission request packet to said server prior to sending the first retransmission request packet;
  else if second missing data packet has a lower priority than said first missing data packet, then sending the second retransmission request packet to said server after to sending the first retransmission request packet.

19. The client computer of claim 18 wherein said priority of first and second missing data packets is based on the respective data type of said missing data packets.

20. The client computer of claim 18 wherein said first missing data packet includes an I video frame, said second missing data packet includes a P video frame, and hence said first missing data packet has a higher priority than said second missing data packet.

21. The client computer of claim 18 wherein said first missing data packet includes a base layer video frame, said second missing data packet includes an enhancement layer video frame, and hence said first missing data packet has a higher priority than said second missing data packet.

22. The client computer of claim 18 wherein a first difference between the first Round_Trip_Time and the first time remaining is less than a second difference between the second Round_Trip_Time and the second time remaining, and hence said first missing data packet has a higher priority than said second missing data packet.

23. The client computer of claim 22 wherein said data stream is a video data stream and wherein said first and said second missing data packets include video frames.

24. The client computer of claim 22 wherein said data stream is an annotation stream and wherein said first and second missing data packets include annotation frames.

25. A method comprising:
  detecting that a first missing data packet has not arrived at a client computer by a first expected time of arrival (ETA);
  computing a first Round_Trip_Time for the first missing data packet, the first Round_Trip_Time being an estimate of a period beginning from a time a first retransmission request is sent from the client computer to a server computer till a time a copy of the first missing data packet is received at the client computer from the server computer in response to the first retransmission request;
  computing a first time remaining before the first missing data packet is due for processing by an application on the client computer;
  sending a first retransmission request packet to the server computer for the first missing data packet upon determining the first Round_Trip_Time is less than the first time; and
  matching a transmission rate dynamically to an available bandwidth capacity of a network connection between the server computer and the client computer.

26. A computer readable medium having computer executable instructions for causing a client computer to perform a method comprising:
  detecting that a first missing data packet from a data stream has not arrived at the client computer by a first expected time of arrival (ETA);
  computing a first Round_Trip_Time for the first missing data packet, the first Round_Trip_Time being an estimate of a period beginning from a time a first retransmission request is sent from the client computer to a server computer till a time a copy of the first missing data packet is received at the client computer from the server computer in response to the first retransmission request;
  computing a first time remaining before the first missing data packet is due for processing by an application on the client computer; and
  sending a first retransmission request packet to the server computer for the first missing data packet upon determining the first Round_Trip_Time is less than the first time.

27. The computer readable medium of claim 26 wherein upon determining the first missing data packet is an important data packet, the first retransmission request packet is sent to the server computer for the first missing data packet even upon determining the first Round_Trip_Time is greater than the first time remaining before the first missing data packet is due for processing by the application on the client computer.

28. The computer readable medium of claim 26 wherein the data stream is a video stream and the first missing data packet includes an I video frame.

29. The computer readable medium of claim 26 wherein the data stream is a video stream and the first missing data packet includes a base layer video frame.

30. The computer readable medium of claim 26 wherein the data stream is an audio stream, the first missing data packet is an audio packet and a data size of the audio packet is greater than a first difference between the first Round_Trip_Time and the first time remaining before the first missing data packet is due for processing by the application on the client computer.

31. The computer readable medium of claim 26, wherein the method further comprises:
  detecting that a second missing data packet has not arrived at the client computer by a second ETA;
  computing a second Round_Trip_Time for the second missing data packet, the second Round_Trip_Time being an estimate of a period beginning from a time a second retransmission request is sent from the client computer to the server computer till a time a copy of the second missing data packet is received at the client computer from the server computer in response to the second retransmission request;
  computing a second time remaining before the second missing data packet is due for processing by the application on the client computer;
  upon determining the second Round_Trip_Time is less than the second time remaining before the second missing data packet is due for processing by the application on the client computer, sending the second retransmission request to the server for the second missing data packet prior to sending a first retransmission request packet to the server computer upon determining the second missing data packet has a higher priority than the first missing data packet; and
  upon determining the second Round_Trip_Time is less than the second time remaining before the second missing data packet is due for processing by the application on the client computer, sending the second retransmission request to the server for the second missing data packet after sending the first retransmission request packet to the server computer upon determining the second missing data packet has a lower priority than the first missing data packet.

32. The computer readable medium of claim 31 wherein the priority of first and second missing data packets is based on the respective data type of the missing data packets.

33. The computer readable medium of claim 31 wherein the first missing data packet includes an I video frame, the second missing data packet includes a P video frame, and hence the first missing data packet has a higher priority than the second missing data packet.

34. The computer readable medium of claim 31 wherein the first missing data packet includes a base layer video frame, the second missing data packet includes an enhancement layer video frame, and hence the first missing data packet has a higher priority than the second missing data packet.

35. The computer readable medium of claim 31 wherein a first difference between the first Round_Trip_Time and the first time remaining is less than a second difference between the second Round_Trip_Time and the second time remaining, and hence the first missing data packet has a higher priority than the second missing data packet.

36. The computer readable medium of claim 35 wherein the data stream is a video data stream and wherein the first and the second missing data packets include video frames.

37. The computer readable medium of claim 35 wherein the data stream is an annotation stream and wherein the first and second missing data packets include annotation frames.

38. A computer readable medium having computer executable instructions for causing a client computer to perform a method comprising:

detecting that a first missing data packet has not arrived at a client computer by a first expected time of arrival (ETA);

computing a first Round_Trip_Time for the first missing data packet, the first Round_Trip_Time being an estimate of a period beginning from a time a first retransmission request is sent from the client computer to a server computer till a time a copy of the first missing data packet is received at the client computer from the server computer in response to the first retransmission request;

computing a first time remaining before the first missing data packet is due for processing by an application on the client computer;

sending a first retransmission request packet to the server computer for the first missing data packet upon determining the first Round_Trip_Time is less than the first time; and matching a transmission rate dynamically to an available bandwidth capacity of a network connection between the server computer and the client computer.

\* \* \* \* \*